United States Patent [19]
Tang

[11] Patent Number: 5,929,590
[45] Date of Patent: Jul. 27, 1999

[54] METHOD AND APPARATUS FOR IMPLEMENTING SENSORLESS CONTROL OF A SWITCHED RELUCTANCE MACHINE

[75] Inventor: Yifan Tang, St. Louis, Mo.

[73] Assignee: Emerson Electric Co., St. Louis, Mo.

[21] Appl. No.: 08/779,687

[22] Filed: Jan. 7, 1997

[51] Int. Cl.$^6$ .................................................. H02P 7/05
[52] U.S. Cl. ............................................ 318/701; 318/254
[58] Field of Search .................................... 318/138, 254, 318/439, 700, 701, 720, 721, 722, 724

[56] References Cited

U.S. PATENT DOCUMENTS

| | | | |
|---|---|---|---|
| Re. 28,705 | 2/1976 | Hoffmeyer | 310/180 |
| 2,854,596 | 9/1958 | Weixelman et al. | 310/168 |
| 3,041,486 | 6/1962 | Moffitt | 310/168 |
| 3,204,167 | 8/1965 | Zigler | 318/225 |
| 3,518,473 | 6/1970 | Nordebo | 310/168 |
| 3,564,312 | 2/1971 | Bunea | 310/168 |
| 3,593,051 | 7/1971 | Akbar | 310/166 |
| 3,612,988 | 10/1971 | Wanlass | 323/43.5 R |
| 3,648,206 | 3/1972 | Wanlass | 336/160 |
| 3,679,962 | 7/1972 | Wanlass | 321/18 |
| 3,679,966 | 7/1972 | Wanlass | 323/56 |
| 3,704,402 | 11/1972 | Leitgeb | 310/166 |
| 3,881,146 | 4/1975 | Wanlass | 321/2 |
| 3,956,678 | 5/1976 | Byrne et al. | 310/168 |
| 3,980,933 | 9/1976 | Piatkowski, Jr. | 318/138 |
| 3,995,203 | 11/1976 | Török | 318/166 |
| 4,063,135 | 12/1977 | Wanlass | 318/220 |
| 4,095,149 | 6/1978 | Wanlass | 318/220 |
| 4,132,932 | 1/1979 | Wanlass | 318/795 |
| 4,134,055 | 1/1979 | Akamatsu | 318/696 |
| 4,152,630 | 5/1979 | Wanlass | 318/796 |
| 4,187,457 | 2/1980 | Wanlass | 318/729 |
| 4,338,557 | 7/1982 | Wanlass | 318/729 |
| 4,348,605 | 9/1982 | Török | 310/168 |
| 4,446,416 | 5/1984 | Wanlass | 318/812 |
| 4,628,245 | 12/1986 | Quayle | 310/198 |
| 4,670,696 | 6/1987 | Byrne et al. | 318/701 |

(List continued on next page.)

OTHER PUBLICATIONS

Stephenson and Blake, "The Characteristics, Design and Applications of Switched Reluctance Motors and Drives," PCIM Conference & Exhibition, Jun. 21–24, 1993, Nuremberg, Germany.

Li, et al., "A Doubly Salient Permanent Magnet Motor Capable of Field Weakening," U. of Wisconsin—Madison, Dept. of Electrical and Computer Eng. (1995).

Llang, et al., "A New Variable Reluctance Motor Utilizing An Auxiliary Commutation Winding," pp. 423–432, IEEE Transactions on Industry Applications, vol. 30, No. 2, Mar./Apr. 1994.

Llang, et al., "A New Variable Reluctance Motor Utilizing an Auxiliary Commutation Winding," pp. 219–225, IEEE IAS Annual Meeting, Oct. 1992.

Li, et al., "A Doubly Salient Doubly Excited Variable Reluctance Motor," pp. 137–143, IEEE IAS Annual Meeting, Oct. 1993.

Philips, "Switched Reluctance Drives: New Aspects," pp. 454–458, IEEE Transactions on Power Electronics, vol. 5, No. 4, Oct. 1990.

Pulle, "Performance of Split–Coil Switched Reluctance Drive," pp. 318–323, IEE Proc., vol. 135, Pt. B, No. 6 (1988).

Wanlass, et al., "New Directions in Linear Microcircuits," 1968 Wescon Technical Papers, Western Electric Show and Conventions, Aug. 20–23, 1968.

*Primary Examiner*—Bentsu Ro
*Attorney, Agent, or Firm*—Arnold White & Durkee

[57] ABSTRACT

A doubly-fed switched reluctance machine in which at least two sets of phase winding are energized to produce desired output torque is disclosed. Also disclosed are dual and single power converters for energizing the doubly-fed machine as well as exemplary excitation schemes position. Sensorless techniques and systems for controlling the doubly-fed machine, and other machines having fully-pitched or fractional-pitched windings, are also disclosed.

27 Claims, 35 Drawing Sheets

U.S. PATENT DOCUMENTS

| | | | |
|---|---|---|---|
| 5,017,845 | 5/1991 | Carobolante | 318/138 |
| 5,113,113 | 5/1992 | Tepavcevic | 318/701 |
| 5,180,960 | 1/1993 | Austermann | 318/701 |
| 5,245,256 | 9/1993 | Cassat et al. | 318/254 |
| 5,304,882 | 4/1994 | Lipo et al. | 310/156 |
| 5,376,851 | 12/1994 | Lipo et al. | 310/179 |
| 5,410,203 | 4/1995 | Lürkens | 310/163 |
| 5,455,473 | 10/1995 | Lipo et al. | 310/114 |
| 5,459,385 | 10/1995 | Lipo et al. | 310/701 |
| 5,506,487 | 4/1996 | Young et al. | 318/811 |
| 5,545,938 | 8/1996 | Mecrow | 310/156 |
| 5,646,491 | 7/1997 | Erdman et al. | 318/254 |

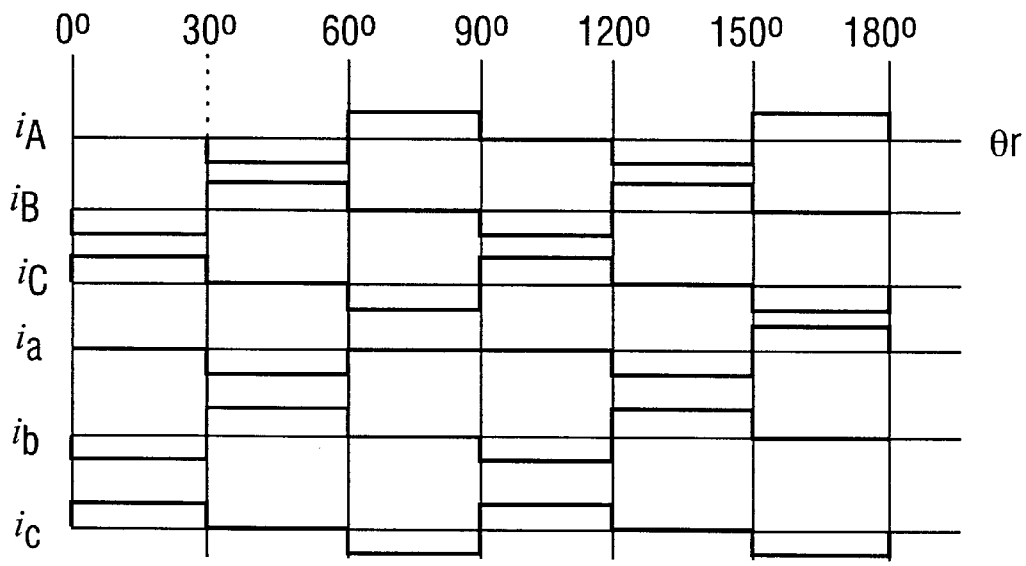
FIG. 22A
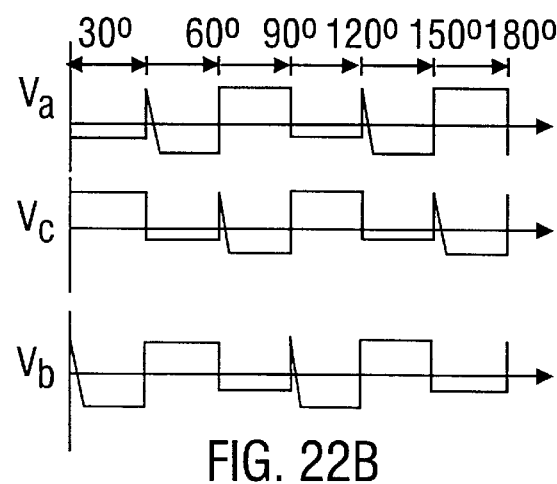
FIG. 22B
| Rotor Position | 0°-30° | 30°-60° | 60°-90° | 90°-120° | 120°-150° | 150°-180° |
|---|---|---|---|---|---|---|
| Measure | $V_a$ | $V_c$ | $V_b$ | $V_a$ | $V_c$ | $V_b$ |
| turn-on | a,A | c,C | b,B | a,A | c,C | b,B |
| turn-off | c,C | b,B | a,A | c,C | b,B | a,A |
| negate | b,B | a,A | c,C | b,B | a,A | c,C |
FIG. 22C

| Rotor Position | 0°-30° | 30°-60° | 60°-90° | 90°-120° | 120°-150° | 150°-180° |
|---|---|---|---|---|---|---|
| Measure | $V_a$ | $V_c$ | $V_b$ | $V_a$ | $V_c$ | $V_b$ |
| turn-on | a,B | c,A | b,C | a,B | c,A | b,C |
| turn-off | c,C | b,B | a,A | c,C | b,B | a,A |
| negate | b | a | c | b | a | c |

METHOD AND APPARATUS FOR IMPLEMENTING SENSORLESS CONTROL OF A SWITCHED RELUCTANCE MACHINE

FIELD OF THE INVENTION

The present invention relates to reluctance machines in general and, in particular, to switched reluctance motors.

BACKGROUND OF THE INVENTION

In general, a reluctance machine is an electric machine in which torque is produced by the tendency of a movable part to move into a position where the inductance of an energized phase winding is maximized. In one type of reluctance machine, the energization of the phase windings occurs at a controlled frequency. These machines are generally referred to as synchronous reluctance machines. In another type of reluctance machine, circuitry is provided for detecting the position of the movable part (generally referred to as a "rotor") and energizing the phase windings as a function of the rotor's position. These types of machines are generally known as switched reluctance machines. The present invention is applicable to both synchronous and switched reluctance machines.

The general theory of the design and operation of reluctance machines in general, and of switched reluctance machines in particular, is known in the art and is discussed, for example, in Stephenson and Blake, "The Characteristics, Design and Applications of Switched Reluctance Motors and Drives", Presented at the PCIM '93 Conference and Exhibition at Nuremberg, Germany, Jun. 21–24, 1993.

Conventional reluctance machines include only one set of main phase windings that are selectively energized to produce output torque in a desired direction. Typically, a rotor position transducer ("RPT") is used to detect the angular position of the rotor with respect to the stator. In such systems, the RPT will provide rotor position information to a controller that controls the energization of the switched reluctance machine.

The use of only one set of phase windings is believed to limit the maximum output torque for conventional machines. Moreover, the use of only one set of phase windings often results in undesirable variations in output torque ("torque ripple") that occur when the current is commutated from one phase winding to another phase winding.

A further limitation of conventional switched reluctance machines is that they require an RPT element for proper control purposes. The costs associated with such RPTs often place switched reluctance motors at a disadvantage, especially in applications where such motors compete with open-loop induction motors which do not require RPTs. While some have proposed "sensorless" techniques for detecting the magnitude of the back-EMF of an unenergized phase winding in a reluctance machine and commutating the phase windings when the magnitude reaches a certain level, such techniques are often limited by, and impractical because of the relatively low back-EMFs induced in the unenergized phase windings associated with many reluctance machines.

It is an object of the present invention to overcome these and other limitations of conventional reluctance machines by, inter alia, providing an improved reluctance machine system that more fully utilizes the iron and the self and mutual inductances of the phase windings of the machine for positive torque output to obtain higher torque output with minimal losses; that provides for a smoother torque output with minimal torque ripple; that provides a cost-effective and efficient system for torque production; and that allows for efficient sensorless operation of a switched reluctance machine.

Other objects and advantages of the present invention will be apparent to one of ordinary skill in the art having the benefit of this disclosure.

SUMMARY OF THE INVENTION

In accordance with one embodiment of the present invention a "sensorless" method of controlling a switched reluctance machine having a plurality of phase windings is provided that eliminates the need for a rotor position transducer. In general, this embodiment involves the acts of, over a given rotor interval, energizing at least two of the phase windings; monitoring the voltage on an un-energized phase winding over the given rotor interval; and controlling the energization of the phase windings in response to the monitored voltage changing from a voltage level of one polarity to a voltage level of the opposite polarity.

In one exemplary embodiment the act of controlling the energization of the phase windings in response to the change in the monitored voltage involved a switching act to energize the previously un-energized phase winding in response to the monitored voltage changing from a voltage level of one polarity to a voltage level of the opposite polarity. In alternate embodiments, the act of controlling the energization involves using the detected voltage polarity change to implement an angle control scheme.

The present invention also extends to a switched reluctance machine system that generally includes a switched reluctance machine including a stator, a plurality of phase windings positioned within the stator, and a rotor positioned to rotate relative to the stator; a voltage detection circuit coupled to the phase windings for detecting the voltage on a given phase winding and for generating a control signal in response to the voltage on the phase winding changing from a voltage of one polarity to a voltage of opposite polarity to generate at least one switching signal; and a power inverter responsive to the at least one switching signal for controlling the application of electric power to the phase windings. Alternate constructions of the power inverter and the voltage detection circuitry are contemplated by the present invention.

Other exemplary embodiments of the present invention and other features of the present invention will be apparent to one of ordinary skill in the art having the benefit of this disclosure.

BRIEF DESCRIPTION OF THE DRAWINGS

FIG. 22A illustrates the currents associated with the energization scheme of FIG. 9A as applied to the reluctance machine of FIG. 1.

FIG. 22B illustrates the voltages Va, Vb and Vc that may be detected on the fully-pitched windings of an exemplary machine constructed according to certain teachings of the present invention.

FIG. 22C illustrates the appropriate switching acts that should occur in response to the detection of sign changes in the induced voltages in an unenergized fully-pitched winding.

DETAILED DESCRIPTION OF THE INVENTION

Figure 1:
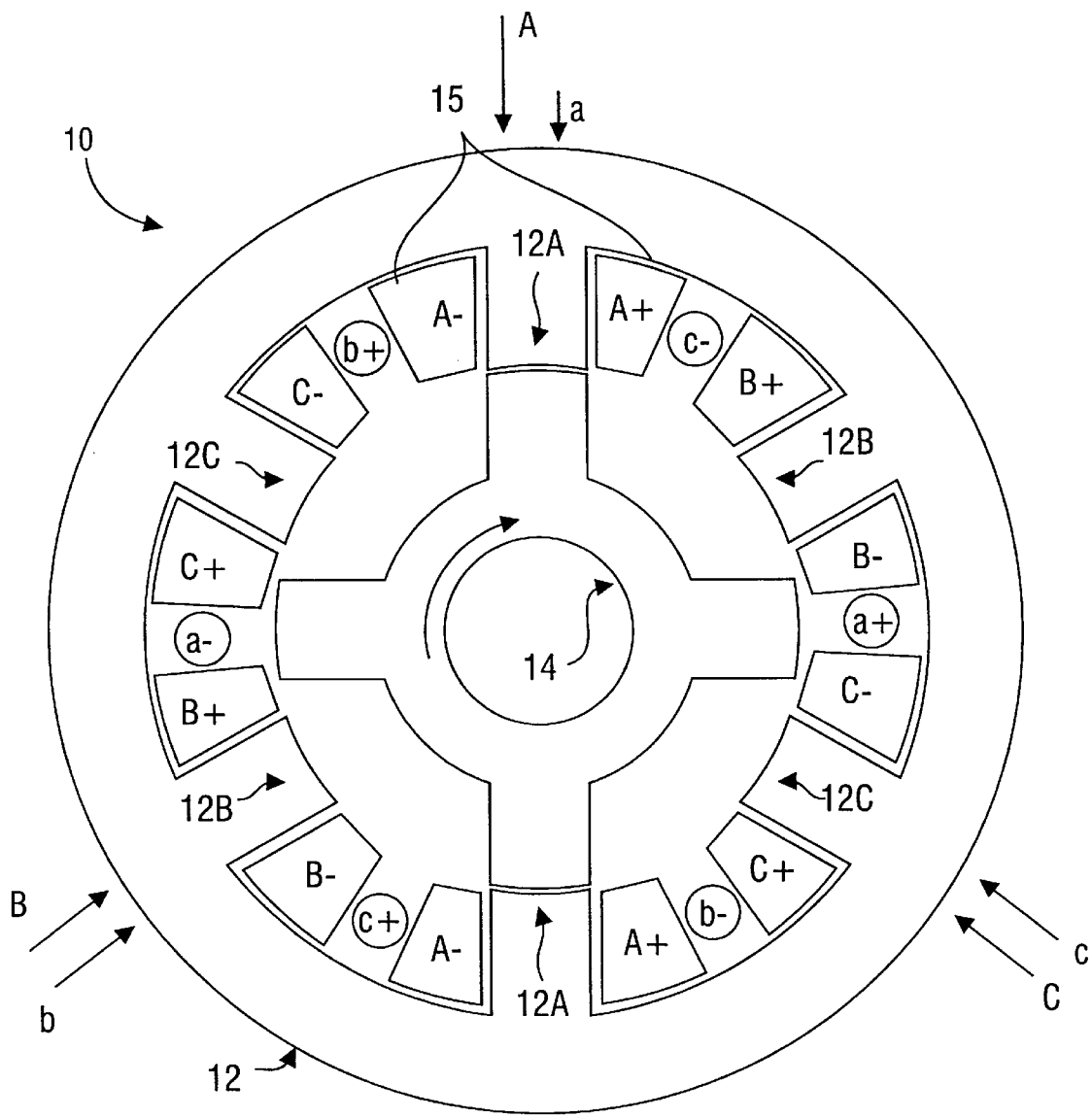
FIG. 1 illustrates a cross-sectional view of an exemplary reluctance machine constructed according to the teachings of the present invention.

Turning to the drawings and, in particular FIG. 1, a cross-sectional view of a reluctance machine 10 in accordance with the present invention is provided. In general, the machine 10 comprises a stator 12 and a rotor 14 positioned within the stator in such a way that it is free to rotate within the stator.

The rotor 14 comprises a stack of identical steel laminations that define four outwardly projecting rotor poles. The rotor may be of conventional construction.

The stator 12 may be constructed from a stack of identical steel stator laminations in accordance with standard reluctance machine techniques. In the exemplary embodiment of FIG. 1, the stator defines six inwardly projecting discrete stator poles.

Three short-pitched phase windings A, B and C are positioned around the stator poles so as to define three stator pole pairs 12A, 12B, and 12C. Each of phase windings A, B and C is a "short-pitch" winding, in that, each of the coils comprising the various phase windings surrounds only a single stator pole. For example, the coil 15 surrounds only one stator pole. In the example of FIG. 1, each short-pitched phase winding comprises two coils (connected in series or parallel) and each short-pitched phase winding is separately energizable from the other short-pitched phase windings.

The coils of the short-pitched phase windings A, B and C are positioned such that the magnetic fields established when uni-directional current flows in the short-pitched phase windings, in the same direction, have an orientation corresponding to the arrows A, B and C of FIG. 1. For example, the coils may be positioned such that, when current flows in a given direction through all three short-pitched phase windings A, B and C, the tips of the arrows would be the north poles of the respective magnetic fields. Conversely, in alternate embodiments with different winding arrangements, the tips could be the south poles.

The construction of a stator 12 and short-pitched phase windings A, B and C meeting the above criteria is well within the ability of one of ordinary skill in the art having the benefit of this disclosure and will not be discussed further herein.

In addition to the three separately energizable short-pitched phase windings A, B, and C, machine 10 also includes three fully-pitched phase windings a, b and c. The phase windings a, b and c are "fully-pitched," in that, the number of stator poles encircled by each coil of the phase a, b and c windings is equal to the total number of phases. The three fully-pitched phase windings a, b and c may be placed within the stator as illustrated in FIG. 1 and may be energized to produce magnetic fields having directions corresponding to the arrows for a, b, and c. The same convention concerning the direction of the produced magnetic fields described above in connection with the short-pitched windings is used.

The provision of two sets of phase windings (short-pitched windings A, B and C and fully-pitched windings a, b, and c) produces mutual coupling effects that are useful for torque production and for the commutation of the current in the various phase windings.

Figure 2A:
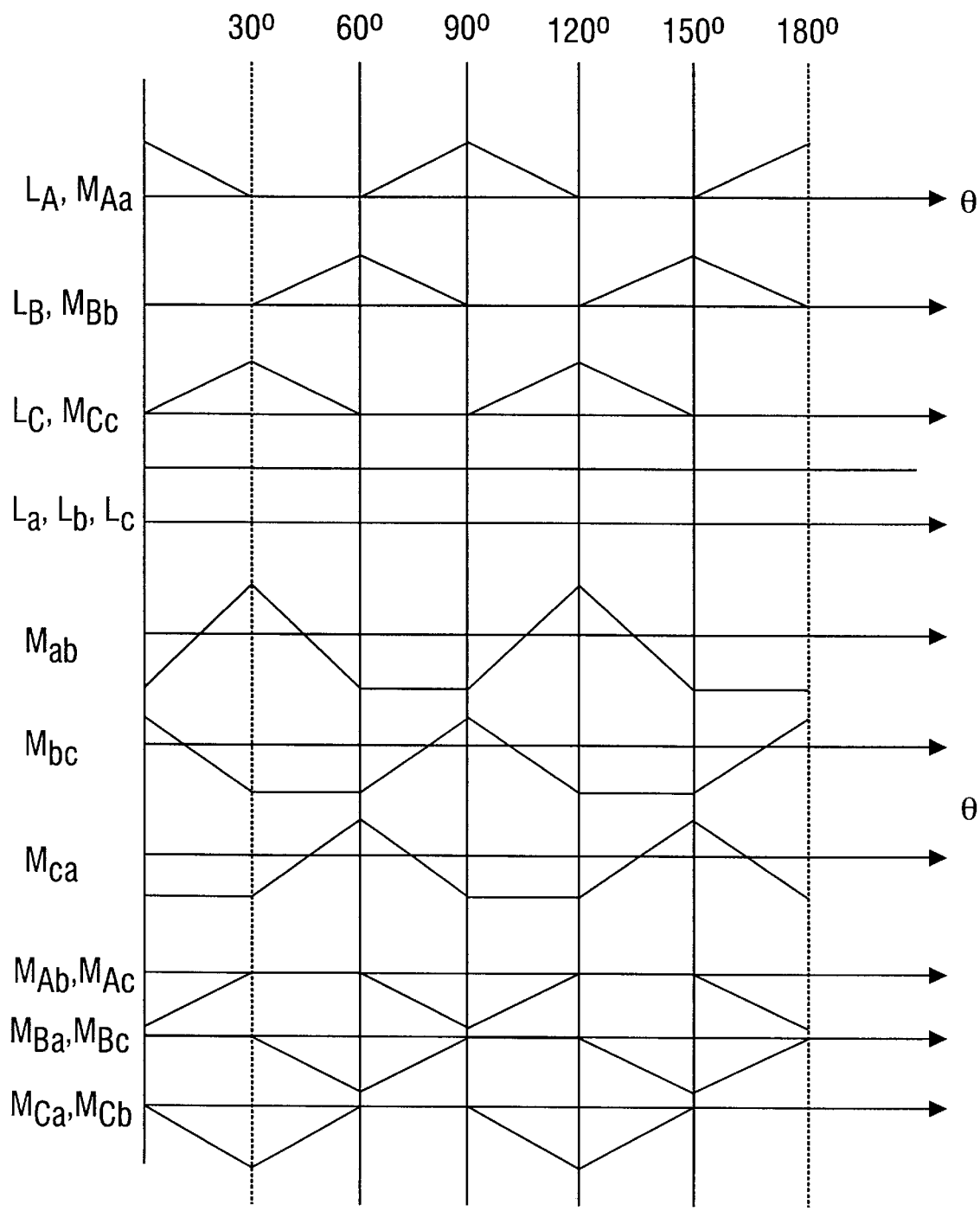
FIG. 2A illustrates idealized representations of the various inductances associated with the machine of FIG. 1.

This is generally reflected in FIG. 2A, which illustrates, as a function of rotor position, idealized representations of the self-inductances of the three short-pitched main winding $L_A$, $L_B$, and $L_C$, the self-inductances of the three fully-pitched windings $L_a$, $L_b$, and $L_c$, and the mutual inductances between the short-pitched and fully-pitched windings $M_{Aa}$, $M_{Ab}$, $M_{Ac}$, $M_{Ba}$, $M_{Bb}$, $M_{Bc}$, $M_{Ca}$, $M_{Cb}$, and $M_{Cc}$ and the mutual inductances between the fully-pitched windings $M_{ab}$, $M_{bc}$ and $M_{ca}$ for the machine 10 of FIG. 1. Only 180 degrees of rotor rotation is illustrated. Because of the symmetric nature of machine 10, the remaining 180 degrees of rotor rotation required to complete one mechanical revolution will be identical to the illustrated portion.

Because of the existence of the self-inductances and mutual-inductances for the machine 10 of FIG. 1, the total torque output of the machine $T_e$ will vary depending on the angular position of the rotor with respect to the stator and with the particular phase windings that are energized. An exemplary rotor position where the phase C winding and the phase b and c windings are simultaneously energized may be reflected by the following equation (I):

$$T_e = \frac{1}{2} I_C^2 \frac{\partial L_C}{\partial \theta} + I_C I_c \frac{\partial M_{Cc}}{\partial \theta} + I_C I_b \frac{\partial M_{Cb}}{\partial \theta} + I_b I_c \frac{\partial M_{bc}}{\partial \theta}$$

where the mutual inductances are referenced as in FIG. 2A and where $I_A$, $I_B$ and $I_C$ represent the current in the short-pitched windings and $I_a$, $I_b$ and $I_c$ represent the current in the fully-pitched windings.

Referring to FIG. 2A, it may be noted that there are several rotor positions for which simultaneous energization of one of the short-pitched windings and one or more of the fully-pitched windings will produce torque in a desired direction (i.e., positions where the mutual inductance is changing). For example, between the rotor positions corresponding to 0–30 degrees, the self inductance, $L_C$, of the phase C winding is increasing. Thus, by energizing the phase C winding with positive current, a positive torque contribution corresponding to $$\frac{1}{2} I_C^2 \frac{\partial L_C}{\partial \theta}$$

may be established. Over that same period of rotor rotation, it may be noted that the mutual-inductance between the phase C winding and the phase c winding, $M_{Cc}$, is also increasing. Thus, if positive current is established in the phase c winding over that interval, a positive torque contribution corresponding to $$I_C I_c \frac{\partial M_{Cc}}{\partial \theta}$$

may be established. It may also be noted that over that same interval, the mutual inductance between the phase C winding and the phase b winding is decreasing. Thus, if negative current is established in the phase b winding, a positive torque contribution corresponding to $$I_C I_b \frac{\partial M_{Cb}}{\partial \theta}$$

may be established. Finally, it may also be noted that over this same interval the mutual inductance between the phase c and phase b windings is decreasing. Thus, the establishment of positive current in the phase c winding and negative current in the phase b winding provides a positive torque contribution corresponding to $$I_c I_b \frac{\partial M_{cb}}{\partial \theta}.$$

As the above indicates, by energizing the phase C and phase c windings with positive current, and the phase b winding with negative current, the torque output of the machine 10 will be as reflected in equation (I). This total torque output, with four positive torque contributions, allows for the provision of a greater torque output than is available with conventional machines. While the phase C, b and c windings were used in the above example, those of ordinary skill in the art will appreciate that similar torque outputs may be obtained through appropriate energization of other phase windings.

From FIG. 2A it may be noted that the increased-torque potential of the machine 10 is not limited to the 0–30 degree interval, but instead exists over the full range of rotor rotation.

Figure 2B:
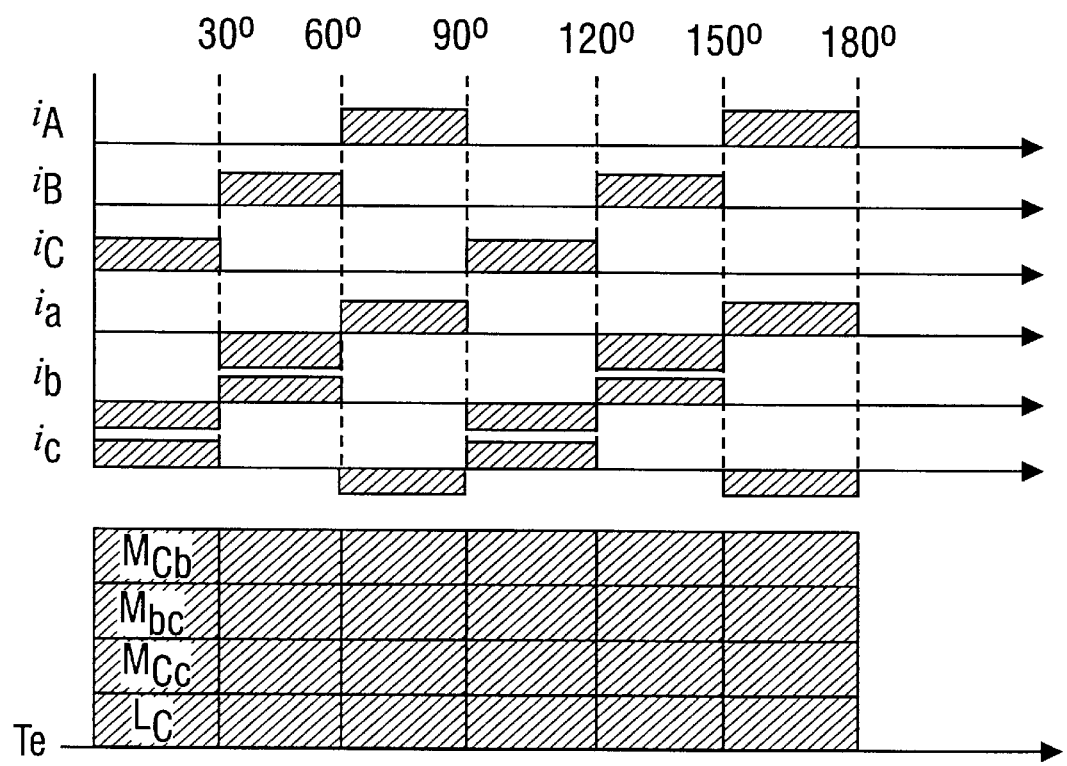
FIG. 2B illustrates an exemplary energization scheme for the machine of FIG. 1.

FIG. 2B illustrates an exemplary energization scheme for the machine 10, including exemplary energization currents for both the short-pitched and the fully-pitched windings. FIG. 2B also illustrates the resulting torque output. As reflected in FIG. 2B, appropriate energization of machine 10 allows for positive torque to be produced at all rotor positions where the torque output at each rotor position is a function of: (i) changes in the self-inductance of an energized short-pitched winding; (ii) changes in the mutual-inductances between the energized short-pitched winding and a first fully-pitched winding; (iii) changes in the mutual inductances between the energized short-pitched winding and a second fully-pitched winding; and (iv) changes in the mutual inductances between the first and second fully-pitched windings.

Figure 3:
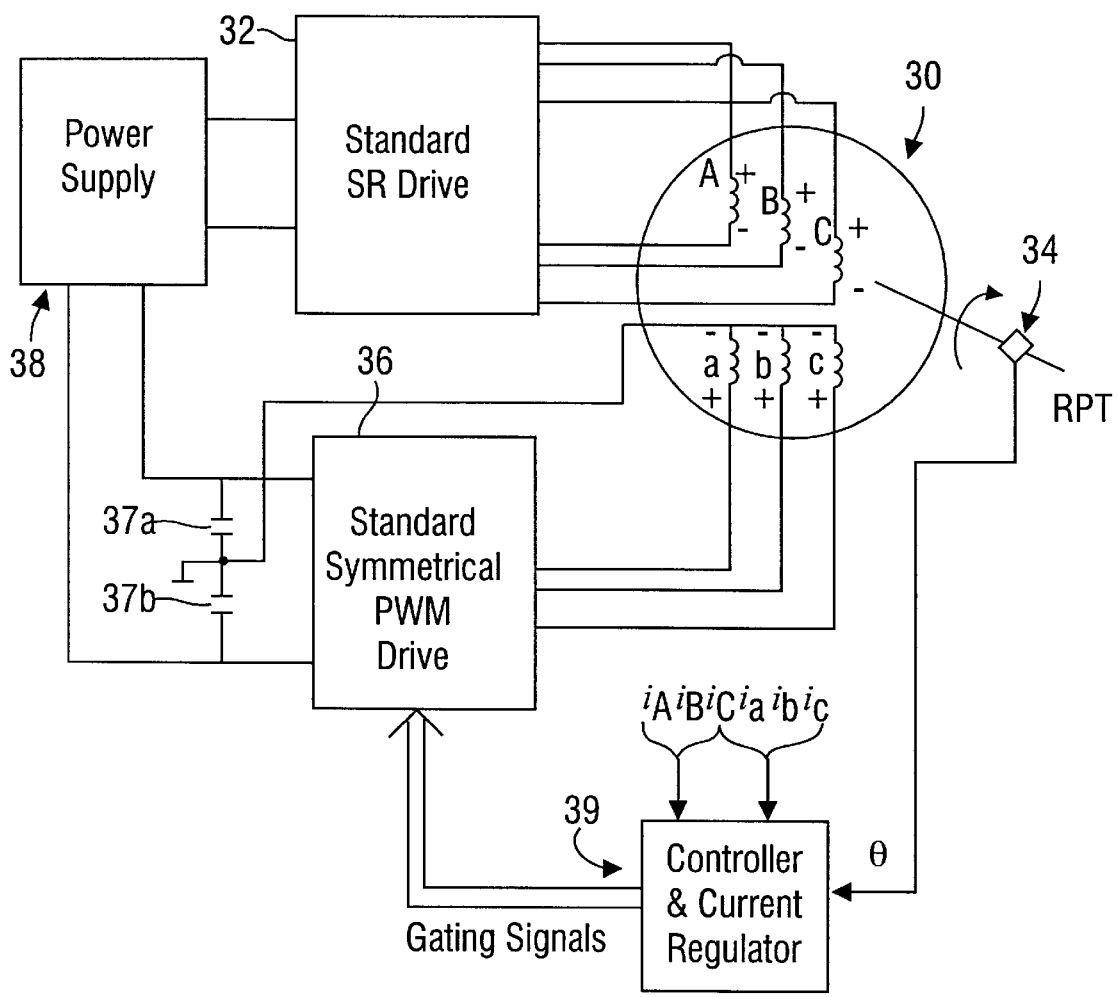
FIG. 3 illustrates a first exemplary system for implementing the energization scheme of FIG. 2B.

FIG. 3 illustrates an exemplary switched reluctance system that may be used to implement the exemplary energization scheme of FIG. 2B.

Turning to FIG. 3, a reluctance machine 30 is generally illustrated. The reluctance machine may be constructed similar to machine 10 of FIG. 1. For explanatory purposes, the three short-pitched windings A, B and C and the three fully-pitched windings a, b and c are each illustrated schematically as single inductors, although those of ordinary skill in the art will appreciate that the phase windings actually comprise one or more coils positioned within the stator and about the stator poles.

Coupled to the three short-pitched windings A, B and C is a standard switched reluctance drive 32. As reflected in FIG. 2B, the exemplary energization scheme for phase windings A, B and C is similar to that associated with conventional reluctance machines. Accordingly, the drive 32 may be of conventional construction and may allow for the energization of the phases of reluctance machine 30 in both single-pulse and chopping mode.

Coupled to the three fully-pitched windings a, b and c is a standard symmetrical pulse width modulation drive 36. Drive 36 may be any appropriate drive circuit that is capable of establishing both positive and negative energization currents in the phase a, b and c windings according to the energization scheme of FIG. 2B. The construction of such a symmetrical controller 36 will be within the ability of one of ordinary skill in the art having the benefit of this disclosure. In the particular embodiment reflected in FIG. 3, controller 36 uses a split-capacitor system including capacitors 37a and 37b.

In the embodiment of FIG. 3, both the standard switched reluctance drive 32 and the standard symmetrical drive 36 are powered from a common power supply 38 which may take the form of a standard AC-DC converter.

In the embodiment of FIG. 3, a single controller 39 receives: (i) rotor position information from a rotor position transducer 34; (ii) information concerning the currents in the short-pitched phase windings ($I_A$, $I_B$ and $I_C$); and (iii) information concerning the currents in the fully-pitched phase windings ($I_a$, $I_b$ and $I_c$) and generates appropriate gating signals for the power switching devices in drives 32 and 36 to implement the energization scheme of FIG. 2A. The construction of controller 39 will be well within the ability of one of ordinary skill in the art having the benefit of this disclosure.

Through the use of the system of FIG. 3, it is possible to produce greater output torque, with higher efficiency and less torque ripple than was previously available with conventional machines.

Figure 4:
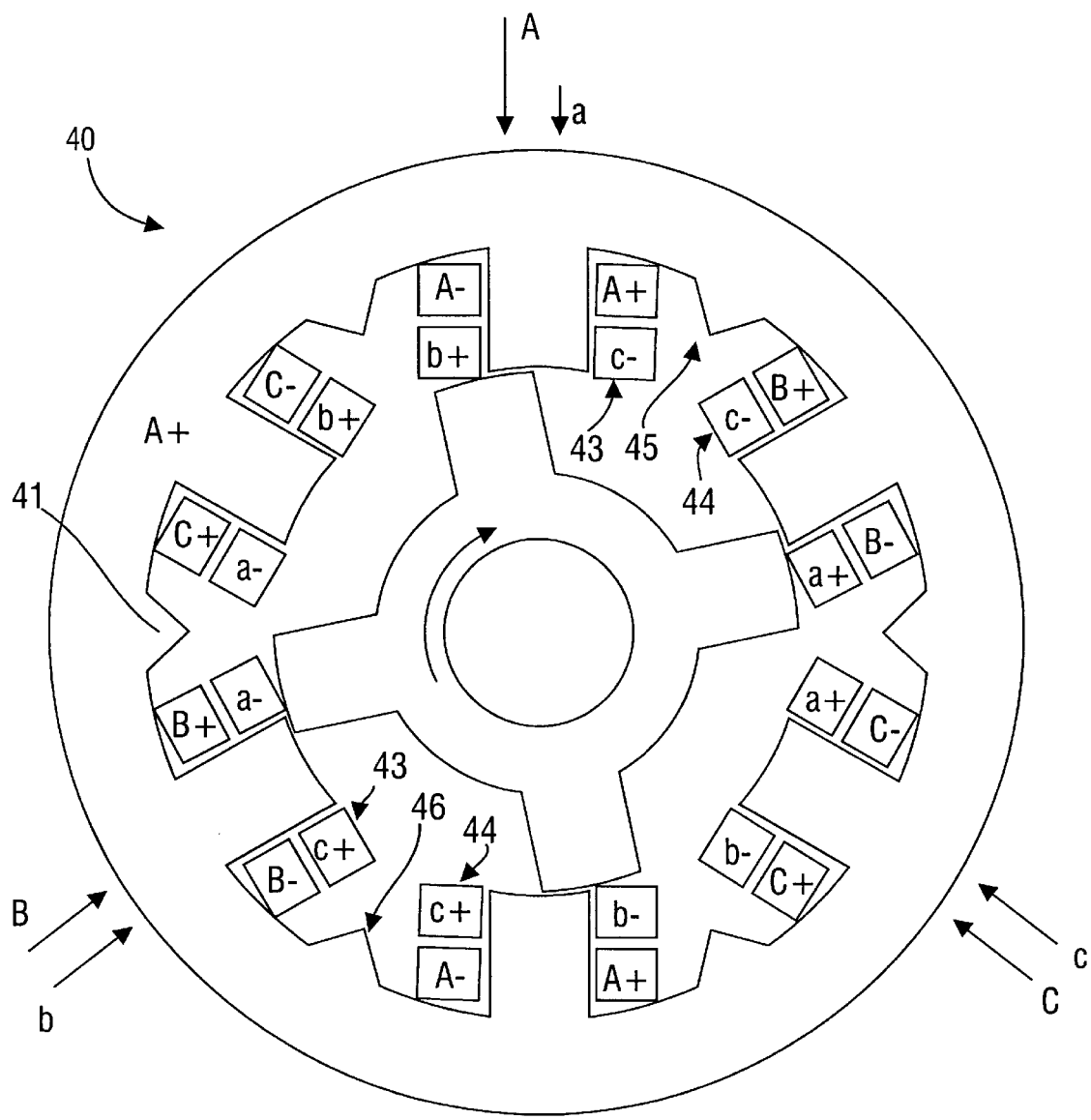
FIG. 4 illustrates a first alternate embodiment of the machine of FIG. 1.
Figure 5:
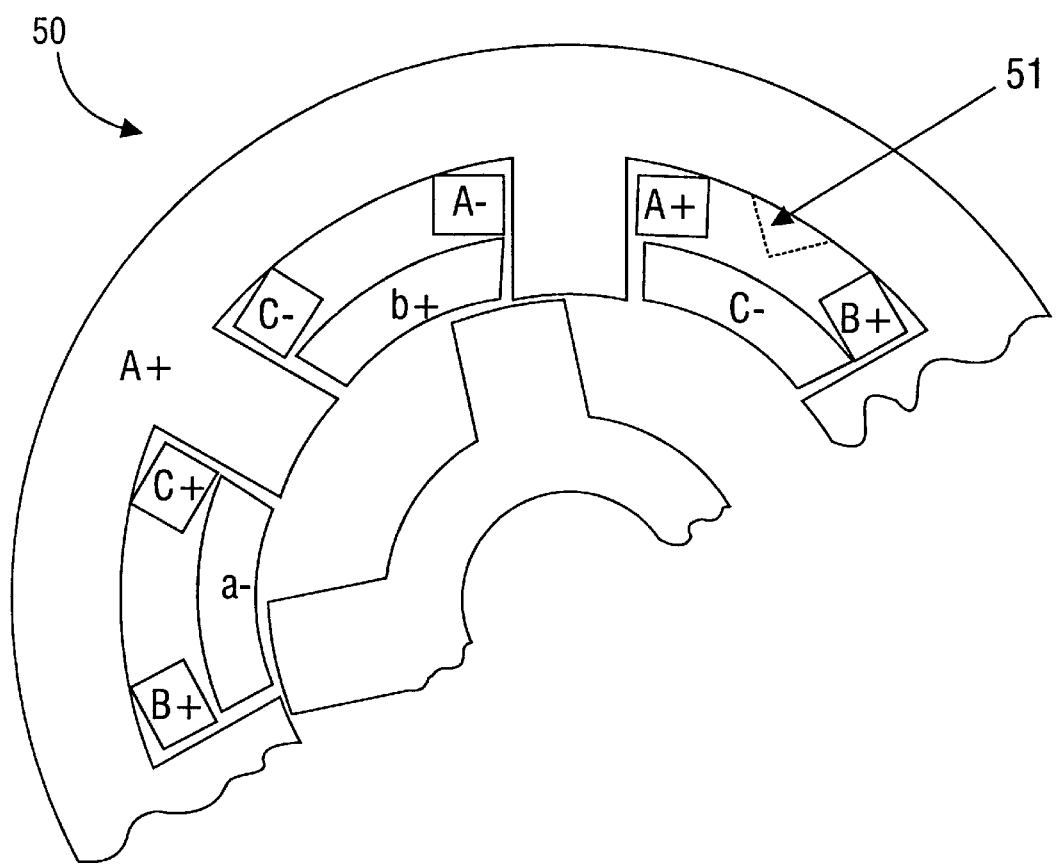
FIG. 5 illustrates a portion of a second alternate embodiment of the machine of FIG. 1.

The construction of machine 10 illustrated in FIG. 1 is only exemplary of the type of machine that may be constructed from the teachings of the present invention. Alternate constructions having different numbers of rotor and/or stator poles, or different numbers of phase windings are envisioned. Still further, alternate placements of the short-pitched and fully-pitched windings are envisioned. FIGS. 4 and 5 illustrate two such embodiments.

In the embodiment of the present invention illustrated in FIG. 1, each fully-pitched winding consisted of a single coil. Such winding arrangements are suitable for a number of applications, but are not necessarily suited for applications where it is desirable to utilize "heat spikes" (e.g., projections extending from the stator into the inter-pole regions of the stator to help absorb and dissipate heat). For such applications, a winding arrangement like that illustrated in FIG. 4 may be desired.

FIG. 4 illustrates an exemplary six-stator pole, four-rotor pole machine 40 constructed according to the teachings of the present invention. The construction of the stator and the rotor, and the placement of the short-pitched windings A, B and C are essentially the same for machine 40 as for the machine 10 described in connection with FIG. 1 with the primary exception being that the stator of machine 40 defines a plurality of heat-spikes 41 that project into the inter-pole regions of the stator. For purposes of illustration, only one heat-spike 41 is labeled.

Each of the fully-pitched windings a, b and c of machine 40 is positioned between the same stator poles as for its corresponding winding in machine 10. To facilitate the heat-spikes 41, however, each of the fully-pitched windings a, b and c is formed from two electrically coupled coils, with one coil being positioned on either side of a given heat spike. For example, fully-pitched winding c is formed from two coils 43 and 44 with coils 43 and 44 being positioned on opposite sides of heat spikes 45 and 46. The other fully-pitched windings are formed and placed in a similar manner. The use of such multiple-coil windings allows for more efficient use of heat-spikes 41.

FIG. 5 illustrates yet another embodiment of a machine 50 constructed in accordance with the present invention. The construction of the machine 50 is similar to that of machine 10 of FIG. 1, as is the general placement of the short-pitched and fully-pitched windings. Only a portion of the machine 50 is illustrated. The remainder will be clear to one of ordinary skill in the art having the benefit of this disclosure.

As in the embodiment of FIG. 1, each of the fully-pitched coils of machine 50 is formed of a single coil. The fully-pitched coils of machine 50 are not positioned between coils from the short-pitched windings as in FIG. 1, but are instead positioned "below" the coils of the short-pitched winding such that each coil of a fully-pitched winding essentially covers the short-pitched coils. For example, one of the coils from the phase b winding essentially covers coils from the phase A and C windings. As reflected by the dashed line 41 in FIG. 5, the winding arrangement of FIG. 5 can accommodate a stator defining inter-pole heat-spikes.

The previous description was directed to a "doubly-fed" reluctance machine system including a specially constructed reluctance machine and two power converters (one for the phase A–C windings, one for the phase a–c windings). Alternate embodiments of such a system are envisioned wherein only a single power excitation converter is used to excite a doubly-fed reluctance machine. One such embodiment is illustrated in FIG. 6.

Figure 6:
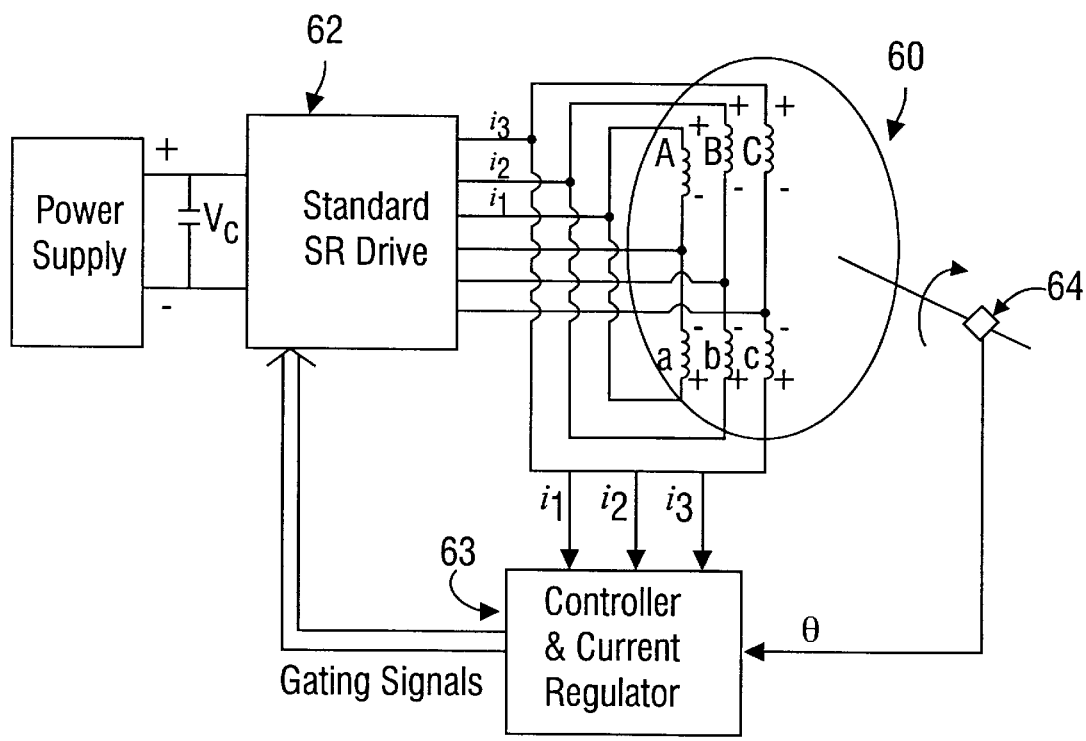
FIG. 6 illustrates a doubly-fed reluctance machine system according to the present invention utilizing a single-power excitation converter.

FIG. 6 illustrates a doubly-fed reluctance machine system including a reluctance machine 60 that may be similar in form to machine 10 of FIG. 1. Coupled to the phase windings A–C and a–c of machine 60 is a standard switched reluctance power converter 62. In the embodiment of FIG. 6, each of the short-pitched phase windings A, B and C is coupled in parallel with its corresponding fully-pitched winding a, b or c. For example, the phase A winding is coupled in parallel with the phase a winding. The parallel connection of the short-pitched winding and the fully-pitched winding is then coupled to the output of the converter 62. Thus, for example, the phase A and phase a parallel combination is coupled to the converter 62 such that positive (or negative) current is supplied simultaneously to both the phase A and phase a winding.

The power converter 62 receives power from a standard AC-DC converter and received gating signals from a controller 63, that generates such gating signals in response to information from a rotor position transducer 64 and current sensors that sense the current flowing to the parallel connection of the short-pitched and fully-pitched windings ($i_1$, $i_2$, $i_3$).

The use of only one power converter in the system of FIG. 6 generally limits the ability of the system to energize the machine 60 using the energization scheme of FIG. 2B. However, increased output torque may be generated with an alternate energization scheme.

Figure 7A:
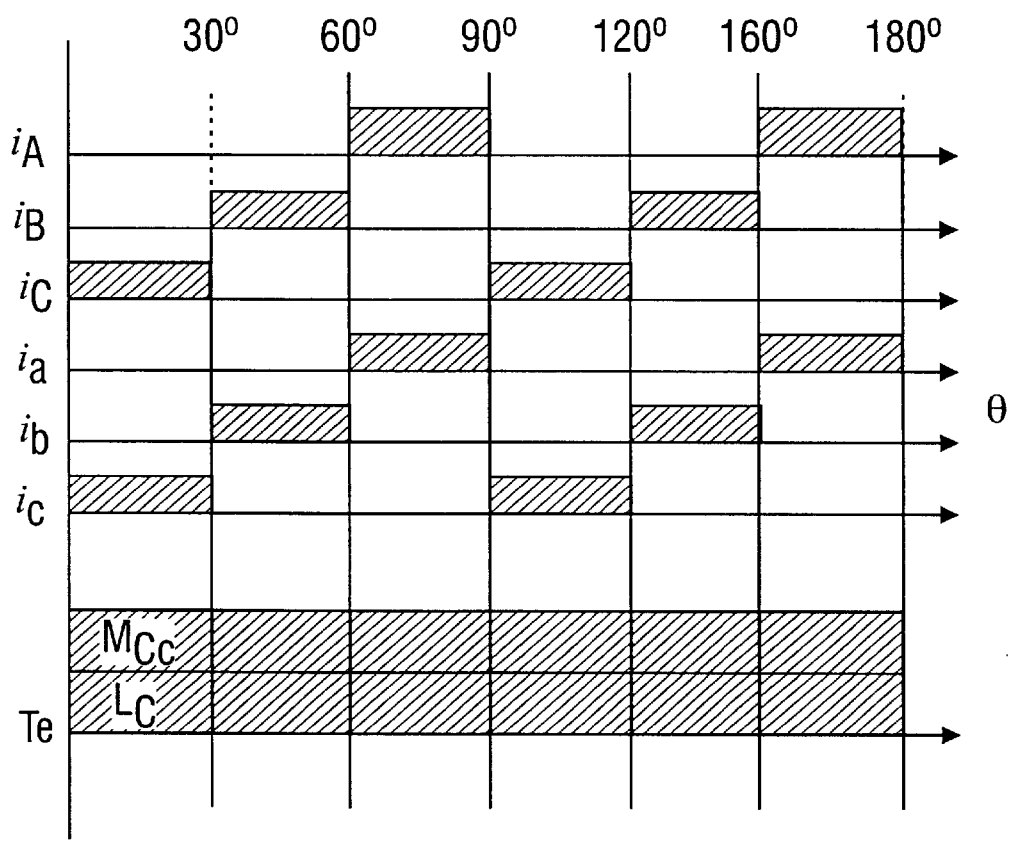
FIG. 7A illustrates an exemplary energization scheme for the machine system of FIG. 6.

FIG. 7A illustrates an exemplary energization scheme for energizing the phase A, B and C and a, b and c windings of machine 60 whose self- and mutual-inductances are the same as for machine 10 illustrated in FIG. 2A. The energization scheme of FIG. 7A is one that can be implemented using the system of FIG. 6. As reflected in FIG. 7A, at each rotor position there is a positive torque contribution: (i) from the change in the self-inductance of an energized short-pitched winding; and (ii) from the change in the mutual inductance between the energized short-pitched winding and an energized fully-pitched winding. Thus, the total torque output at each rotor position is greater than it would otherwise be for a conventional machine where all of the torque output is generated from changes in the self-inductance of an energized winding.

Figure 7B:
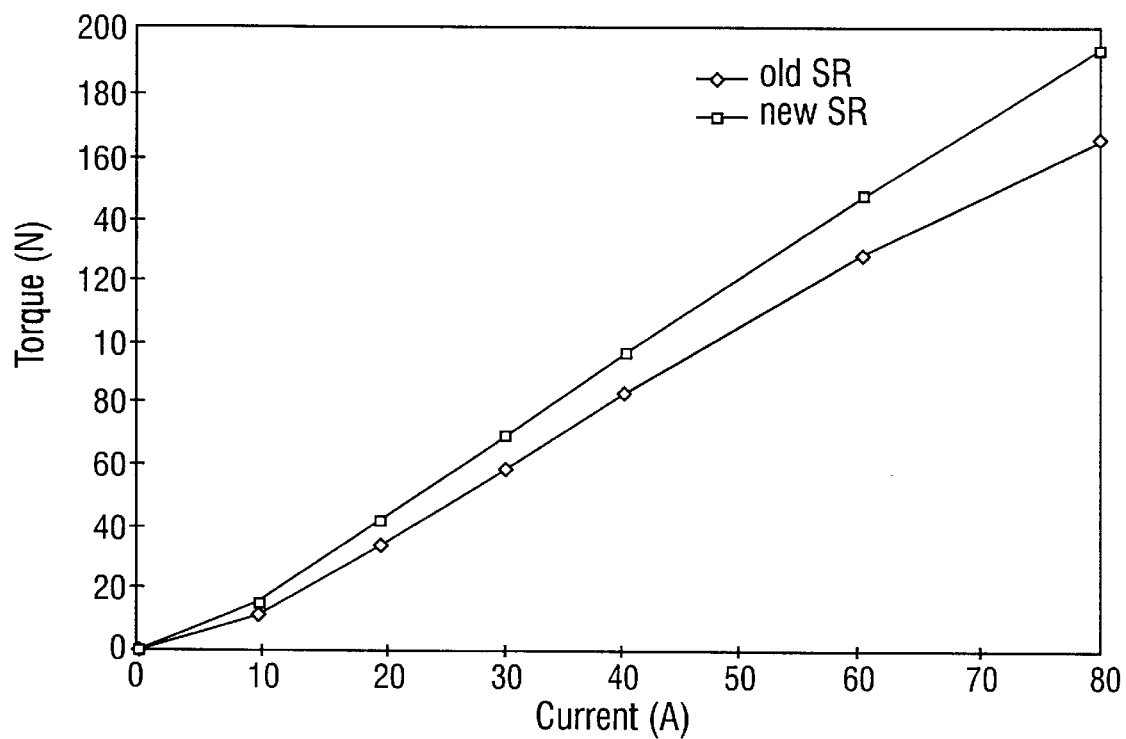
FIG. 7B compares the torque output of a machine constructed according to the teachings of the present invention energized according to the energization scheme of FIG. 7A and a conventional machine.

The difference between the output torque available from the system of FIG. 6 and that available from a conventional machine will depend, in part, on the total numbers of coil turns used to construct the short-pitched and the fully pitched windings. If it is assumed that each fully-pitched winding is formed from one coil of N turns and that each short-pitched winding is formed from two coils of N/2 turns each (for a total of N turns for each short-pitched winding) while the same wire size is used for both the fully-pitched and short-pitched windings, and that the current in the short-pitched and fully-pitched windings is equal, when the magnetic nonlineanity is neglected, the total torque output will be approximately 125% of that available from a similarly-sized and excited reluctance machine having only three short-pitched phase windings with the same slot fill. Taking the magnetic nonlineanity into account, FIG. 7B illustrates the maximum torque output capability as a function of the phase current for a conventional reluctance machine and a machine constructed according to the teachings of the present invention excited according to the excitation scheme of FIG. 7A. As the curves of FIG. 7B indicates, for each value of current the torque output capability of the system constructed according to the teachings of the present invention is greater than that of the conventional machine.

In the embodiment of FIG. 6, corresponding short-pitched and fully-pitched windings were connected in parallel. In an alternate embodiment, corresponding short-pitched and fully-pitched windings could be connected in series. The same energization scheme reflected in FIG. 7A could be used in such an embodiment and the resulting torque output will be approximately equal to that previously provided for the parallel connected system. When a series-connection of the windings is used, however, the rise time of the current in the series-connected windings may become significant, especially at high speeds.

Figure 8:
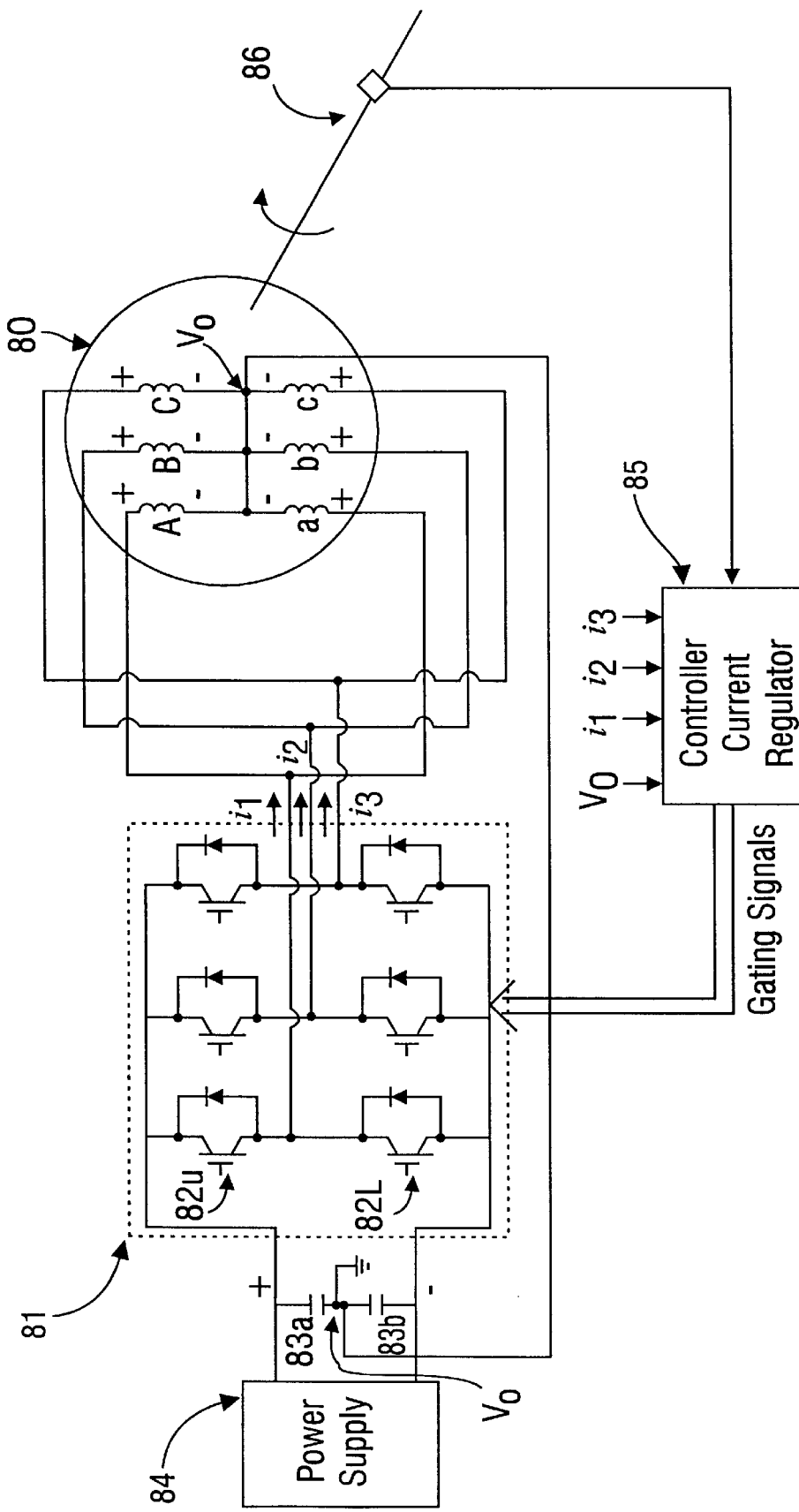
FIG. 8 illustrates a further exemplary embodiment of a doubly-fed reluctance machine system constructed in accordance with the teachings of the present invention.

FIG. 8 illustrates yet another doubly-fed reluctance machine system in accordance with the present invention. A reluctance machine 80 is provided that may have the same construction as machine 10 of FIG. 1. In the embodiment of FIG. 8, as in the exemplary embodiment of FIG. 6, each short-pitched phase A, B or C winding is coupled in parallel with its corresponding phase a, b or c winding. As before, a series connection of the windings may be used.

Coupled to one end of the parallel connections of the short-pitched and fully-pitched windings is a standard split-capacitor pulse width modulation power converter 81. The power converter 81 includes six-power switching devices that form three switching legs. The upper 82U and lower 82L power switching devices of one of the legs are labeled. Coupled to the other end of the parallel connections of the phase windings is a reference node Vo that connects to the junction of two split-capacitors 83a and 83b. The split-capacitors 83a and 83b receive power from a power supply 84 such that the capacitors are charged to provide a positive rail + and a negative rail –, where both rails are referenced to the reference ground node Vo.

As those of ordinary skill in the art having the benefit of this disclosure will appreciate, by rendering one of the two power switching devices conductive, it is possible to establish both positive and negative currents in the phase windings of machine 80. For example, if the power switching device 82U is rendered conductive, electric current will flow from the positive rail + through power switching device 82U, through the parallel connection of the phase A and a windings, and back to the negative rail – through the parallel connection of either phase B and b windings or phase C and c windings and the corresponding lower power switching device. Alternately, if the lower power switching device 82L is rendered conductive, current will flow in the opposite direction, from the + rail through another phase, through the parallel connection of the phase A and a windings and to the – rail through the power switching device 82L. Any unbalance current between two conducting phases is conducted between the reference node Vo and the split-capacitor junction. Thus, through appropriate control, both positive and negative currents may be established in the windings of machine 80.

In the embodiment of FIG. 8, the gating of the power switching devices of converter 81 is controlled by a controller and current regulator 85 that received rotor position information from rotor position transducer 86. The regulator 85 may use known pulse width modulation, pulse frequency modulation or bang-bang techniques to control the current in the various phase windings.

Figure 9A:
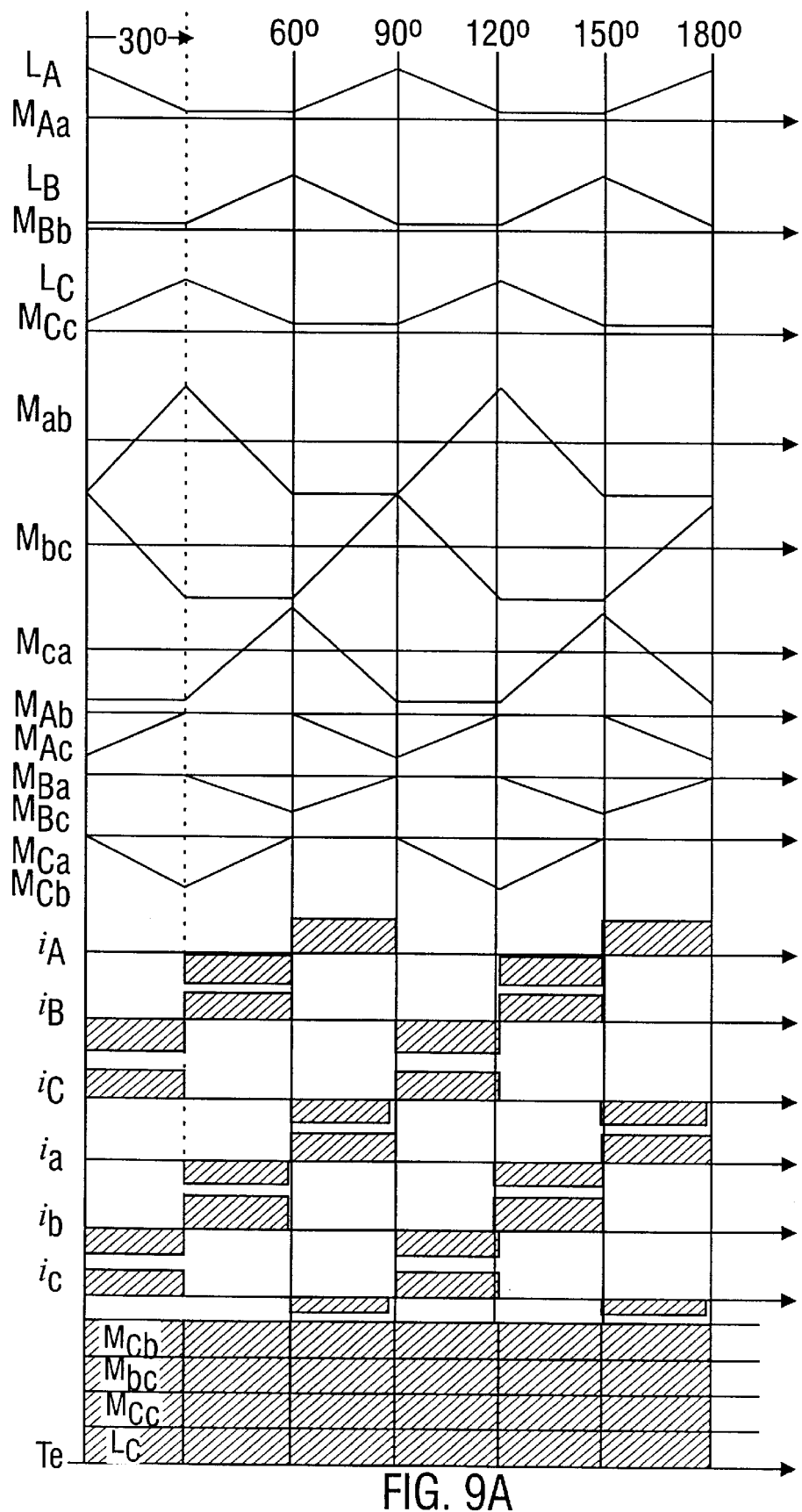
FIG. 9A illustrates various inductances associated with the machine system of FIG. 8 and a first exemplary energization scheme.

Because both positive and negative current may be established in the phase windings of machine 80, it is possible to energize machine 80 to provide more output torque than would be available from a conventional machine. FIG. 9A illustrates idealized waveforms for the mutual and self-inductances for machine 80, an exemplary excitation scheme and the resulting output torque. As may be noted from a comparison of the energization scheme of FIG. 9A with that of FIG. 2B, the system of FIG. 8 allows for the energization of a doubly-fed reluctance machine with a single converter according to an energization scheme that closely follows that of FIG. 2A.

The primary difference between the energization scheme of FIG. 9A and that of FIG. 2A is that, for the phase A, B and C windings, there are intervals when current is supplied to the phase winding when the self-inductance of the winding is not changing. For example, during interval defined by rotor positioned between 30–60 degrees and 120–150 degrees, negative current is supplied to the phase A winding. Over this interval, however, the self-inductance of the phase A winding is constant, as is the mutual-inductance between the phase A winding and the phase a, b and c windings. Because torque production is a function of changes in the inductances of an energized phase winding, the energization of the phase A winding over these intervals does not produce either positive torque or negative torque and results in some resistance losses caused by the flow of current through the phase A winding. These slight losses, however, are more than offset by the fact that the system of FIG. 8 allows for essentially maximum torque production with only one excitation converter and fewer connection leads between the motor and the converter.

Figure 9B:
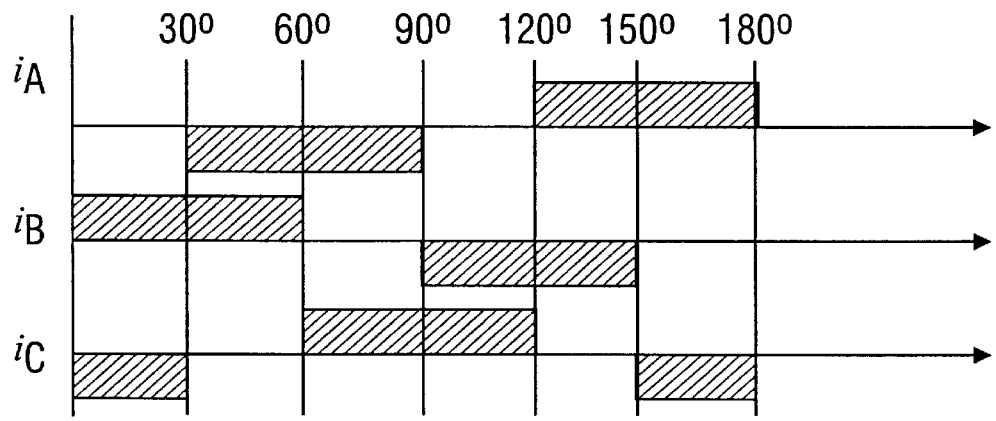
FIG. 9B illustrates a second exemplary energization scheme that may be used with the system of FIG. 8.
Figure 9B:
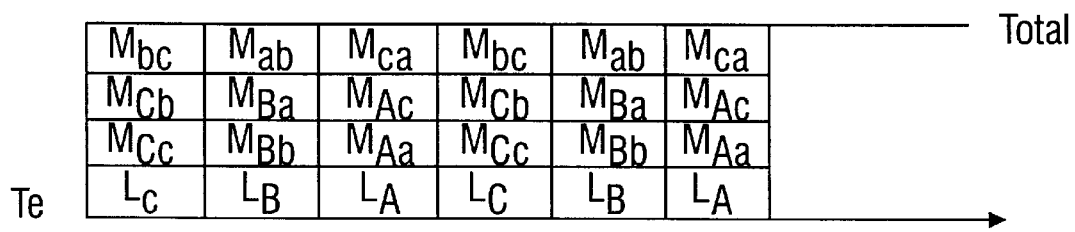

The energization scheme reflected in FIG. 9A is but one example of the type of excitation scheme that may be implemented with the drive of FIG. 8. FIG. 9B illustrates an alternate energization scheme. In the energization scheme of FIG. 9A, the currents in the phase windings are driven from their maximum positive value to their maximum negative value (or vice versa) over very brief intervals. This rapid switching from peak maximum to/from peak negative values is often difficult to control and can place undue stress on the motor and the drive components. The energization scheme of FIG. 9B illustrates an alternate scheme in which the phase currents transition from peak positive to zero to peak negative (or vice versa) such that rapid switching between peak positive and peak negative values is avoided. In this scheme the phase energization currents for a given phase winding are positive over a first interval (e.g., 60 degrees of rotor rotation) zero over an intermediary interval (e.g., 30 degrees of rotor rotation) and then negative over a third interval (e.g., 30 degrees of rotor rotation). The resulting torque Te output from a machine constructed according to the teachings of the present invention (e.g., the machine of FIG. 1) energized according to the energization scheme of FIG. 9B is reflected in FIG. 9B.

The energization scheme of FIG. 9B is better, in some respects, than the energization scheme of FIG. 9A, in that drastic changes in the polarity of the phase currents are reduced. Moreover, through appropriate switching and coupling of the drive of FIG. 8 to the machine, the link between the reference node Vo and the reference ground between capacitors 83a and 83b may be eliminated.

Figure 9C:
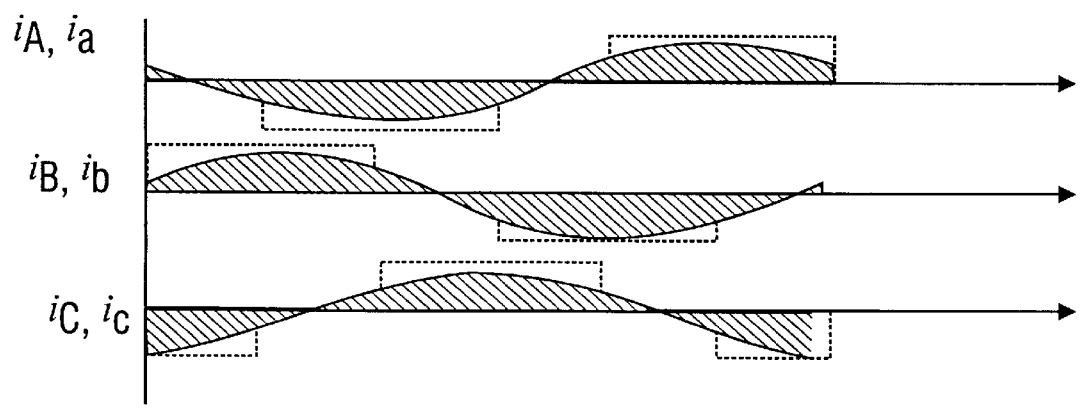
FIG. 9C illustrates a third exemplary energization scheme that may be used with the system of FIG. 8.

FIG. 9C illustrates the energization currents for yet another energization scheme that may be implemented through the use of the drive of FIG. 8. In this energization scheme conventional current control techniques are used in energizing the phase windings with three phase-shifted sinusoidal currents. The torque output Te for this control scheme will be similar to that of the energization scheme of FIG. 9B. Using this energization scheme, conventional sinusoidal drives may be used to drive a machine constructed according to the teachings of the present invention.

Figure 9D:
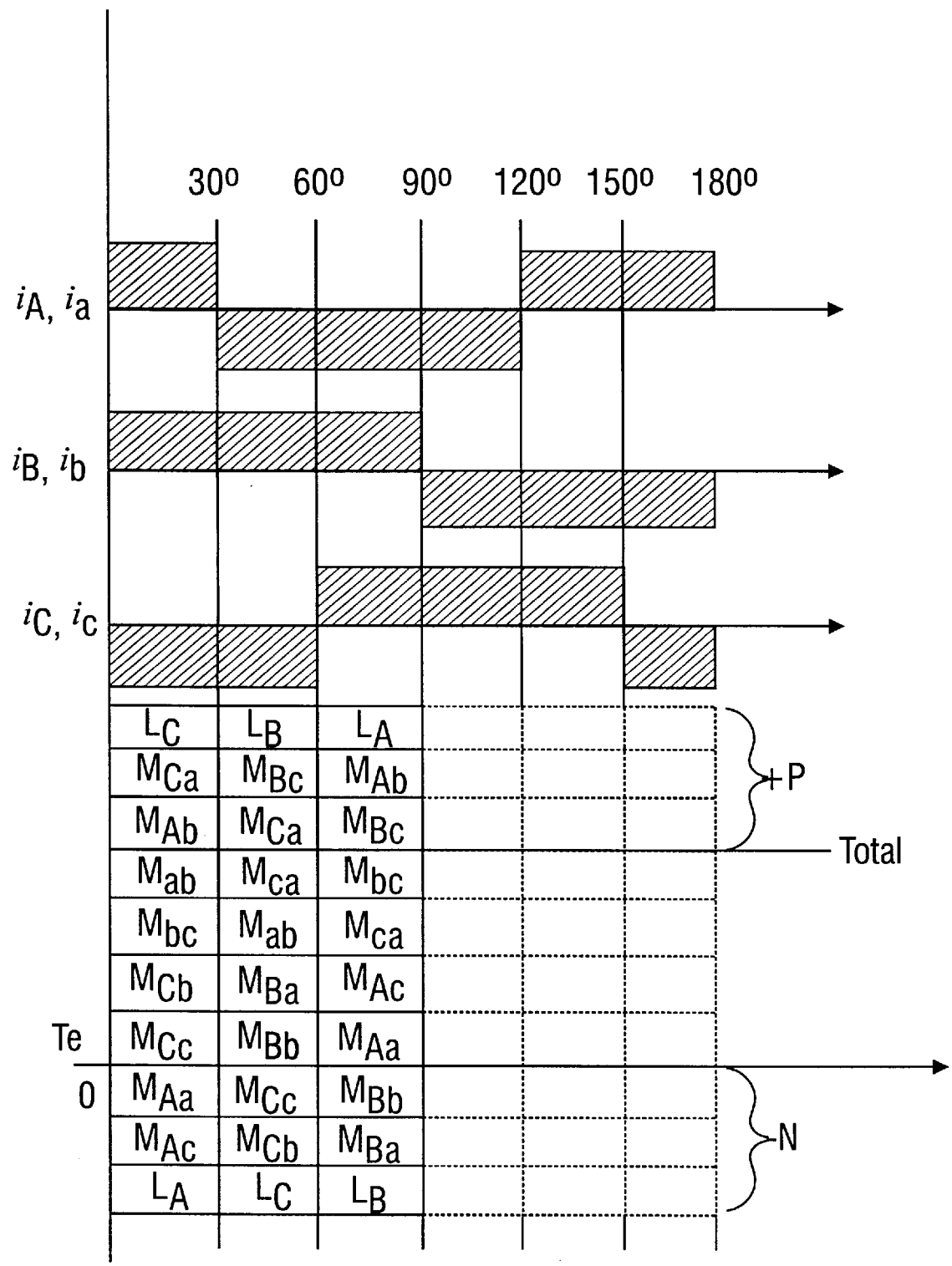
FIG. 9D illustrates a fourth exemplary energization scheme that may be used with the system of FIG. 8.

FIG. 9D illustrates another energization scheme that may be implemented with the drive of FIG. 8. In this energization scheme each of the phase windings is energized at all rotor positions. The total torque output available from this energization scheme is illustrated in FIG. 9D. As may be noted, in this energization scheme there is a negative torque contribution N that tends to off-set some of the positive torque contribution P. Nonetheless, the energization scheme of FIG. 9D is believed to provide the highest net torque output of the energization schemes of FIGS. 9A–9D.

Although the single excitation converter 81 in FIG. 8 is illustrated as a standard split-capacitor pulse width modulation inverter, a converter having a full H-bridge for each parallel or serial connection of the short-pitched and fully-pitched winding can be used without departing form the scope and spirit of the present invention.

As discussed above, the single excitation converters illustrated in FIGS. 6 and 8 may be coupled to parallel or series connections of the short-pitched and fully-pitched windings. Moreover, because the short-pitched winding may comprise a plurality of coils, the coils of the short-pitched winding may be coupled together in parallel or series. FIGS. 10A–10D illustrate alternate couplings of the coils of short-pitched windings and fully-pitched windings of a machine constructed according to the teachings of the present invention.

Figure 10A:
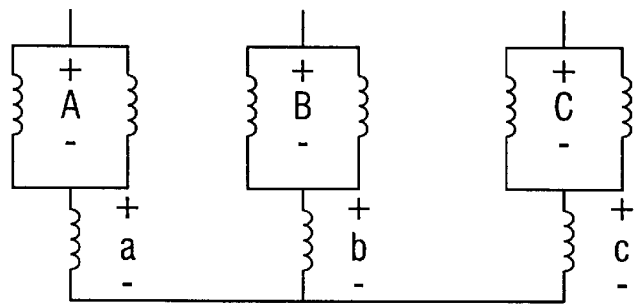
FIGS. 10A–10D illustrate alternate couplings for the coils of the short-pitched and fully-pitched windings of a machine constructed according to the teachings of the present invention.
Figure 10B:
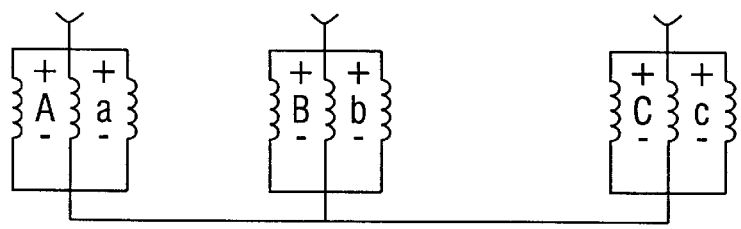
Figure 10C:
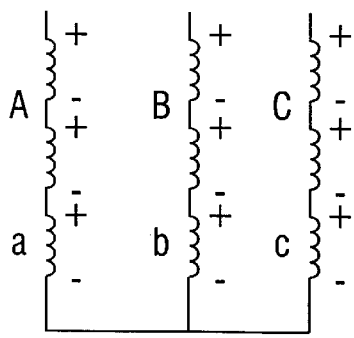
Figure 10D:
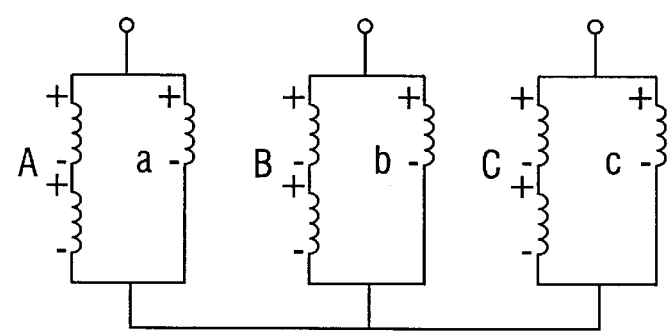

FIG. 10A illustrates an arrangement where each short-pitched winding comprises two coils and where the two sort-pitched coils from each short-pitched winding are coupled in parallel and the short-pitched winding is then coupled in series with the fully-pitched winding. FIG. 10B illustrates an alternate arrangement where the coils of each short pitch winding are coupled in parallel and this parallel connection is coupled in parallel with the corresponding fully-pitched winding. FIG. 10C illustrates a third alternate embodiment where the coils of each short-pitched winding are coupled in series and this series connection is coupled in parallel with the corresponding fully-pitched winding. Finally, FIG. 10D illustrates an alternate embodiment where the coils of the short-pitched winding are coupled in series and this series connection is coupled in series with the corresponding fully-pitched winding. Any of the winding arrangements of FIGS. 10A–10D may be used in the doubly fed systems of FIGS. 6 and 8.

Figure 11:
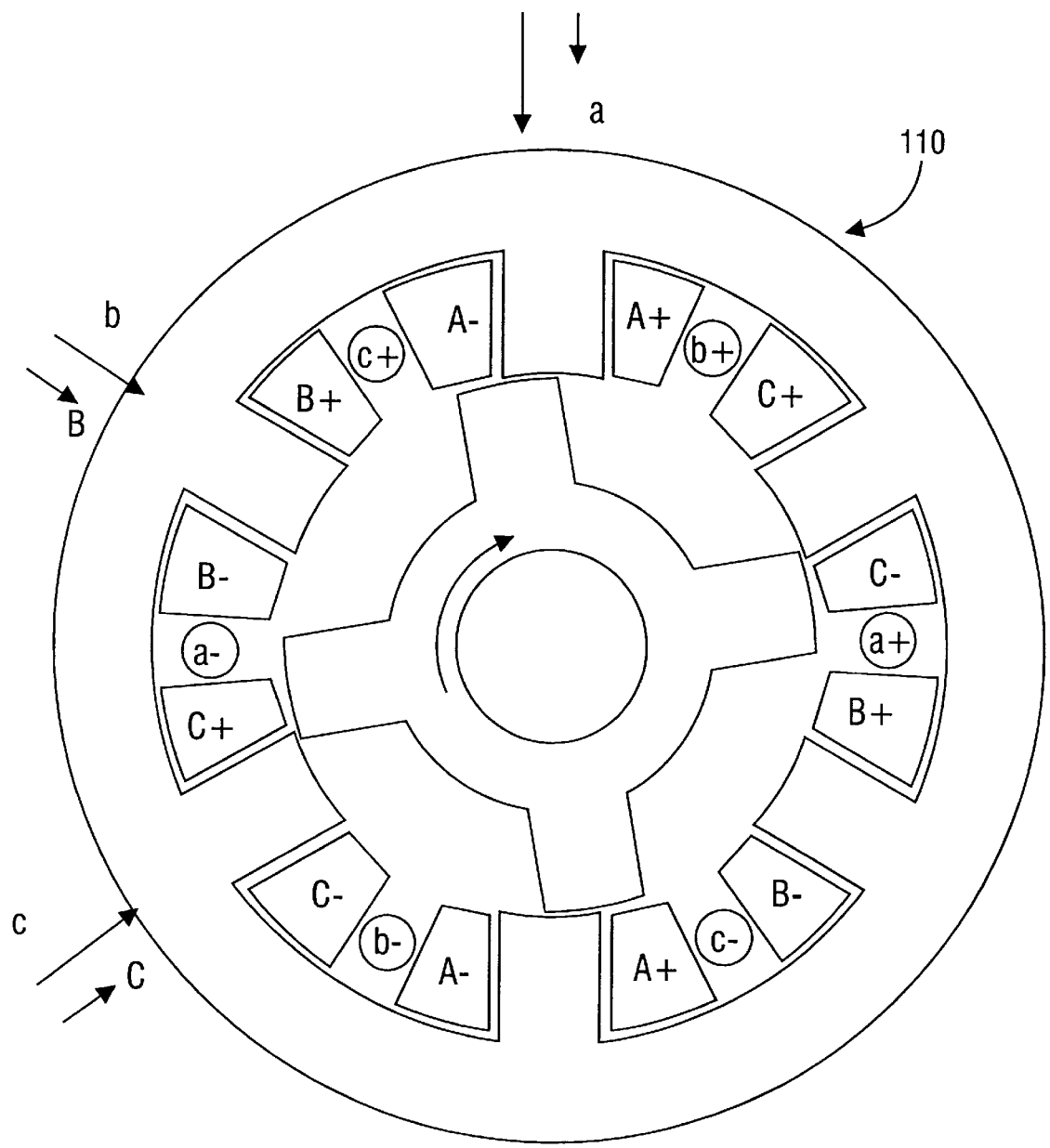
FIG. 11 illustrates an alternate embodiment of the machine of FIG. 1.
Figure 12:
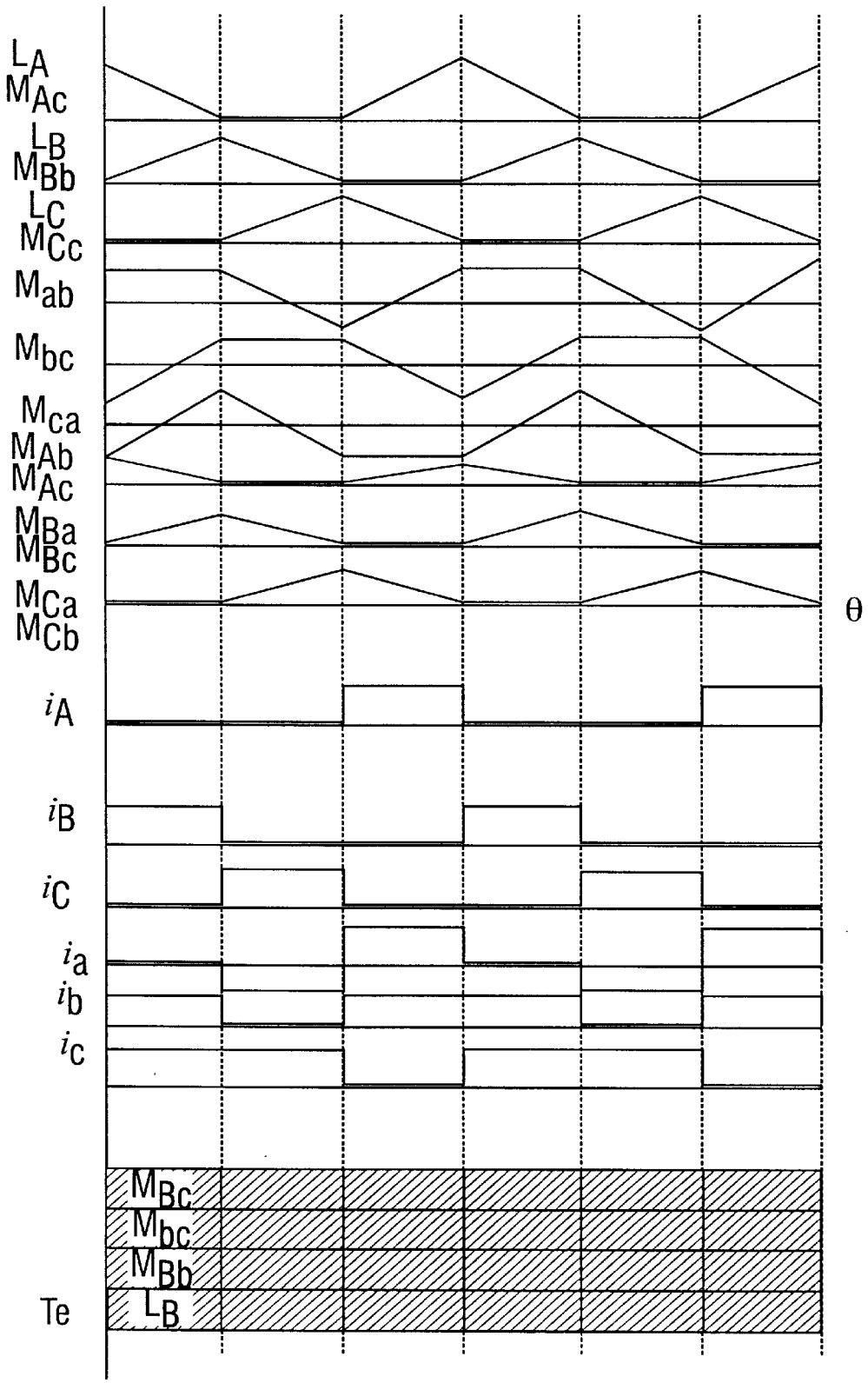
FIG. 12 illustrates various inductances and an exemplary energization scheme for the machine of FIG. 11.

The machine 10 of FIG. 1 used for the previous example of the present invention is but one example of a doubly-fed reluctance machine in accordance with the present invention. FIG. 11 illustrates an alternate embodiment of a machine 110 where the phase A, B and C and phase a, b and c windings are placed in the stator to produce a machine having self and mutual inductance characteristics that are different from that of machine 10. In particular, the phase A, B and C and a, b, and c windings of machine 110 are positioned to establish magnetic fields having orientations corresponding to the arrows in FIG. 11 when positive current is provided to the phase windings. FIG. 12 illustrates idealized self-inductance and mutual-inductance waveforms for machine 110 as well as an energization scheme and the resulting output torque. The power converter arrangements use in the doubly fed reluctance machine systems of any of FIGS. 3, 6 or 8 may be used to implement the energization scheme of FIG. 12.

Figure 13:
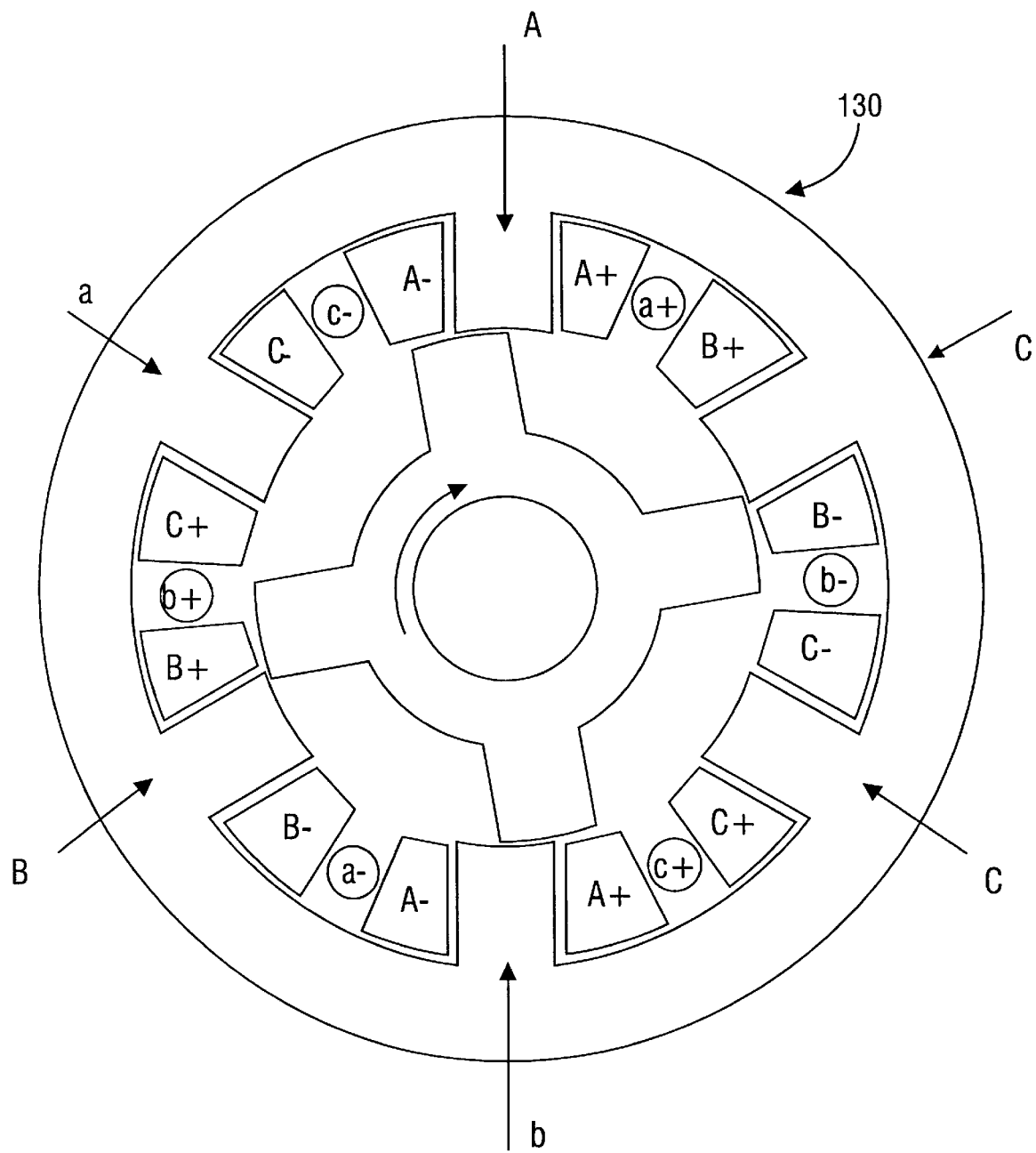
FIG. 13 illustrates a further alternate embodiment of the machine of FIG. 1.

FIG. 13 illustrates yet another alternate embodiment of a doubly-fed reluctance machine 130 constructed according to the teachings of the present invention. As with the machine of FIG. 11, the phase A, B and C and phase a, b, and c winding are positioned within the stator to produce magnetic fields having orientations as reflected by the arrows in FIG. 13 when positive current is applied to the phase windings.

Figure 14:
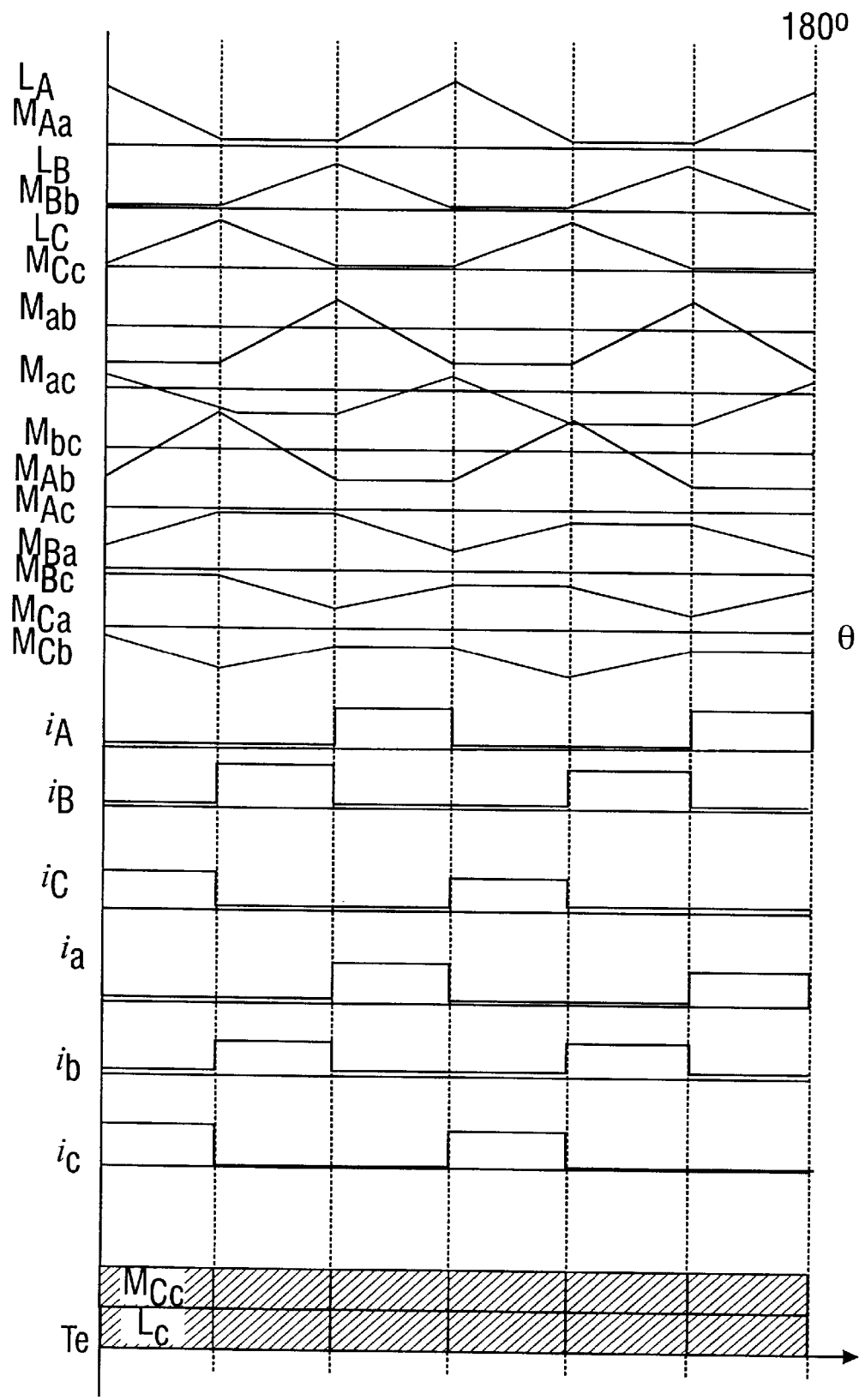
FIG. 14 illustrates various inductances and an exemplary energization scheme for the machine of FIG. 13.

FIG. 14 illustrates idealized self-inductance and mutual-inductance waveforms for machine 130 as well as an energization scheme and the resulting output torque. The power converter arrangements use in the doubly fed reluctance machine system of FIG. 6 is best suited to implement the energization scheme of FIG. 14.

Figure 15:
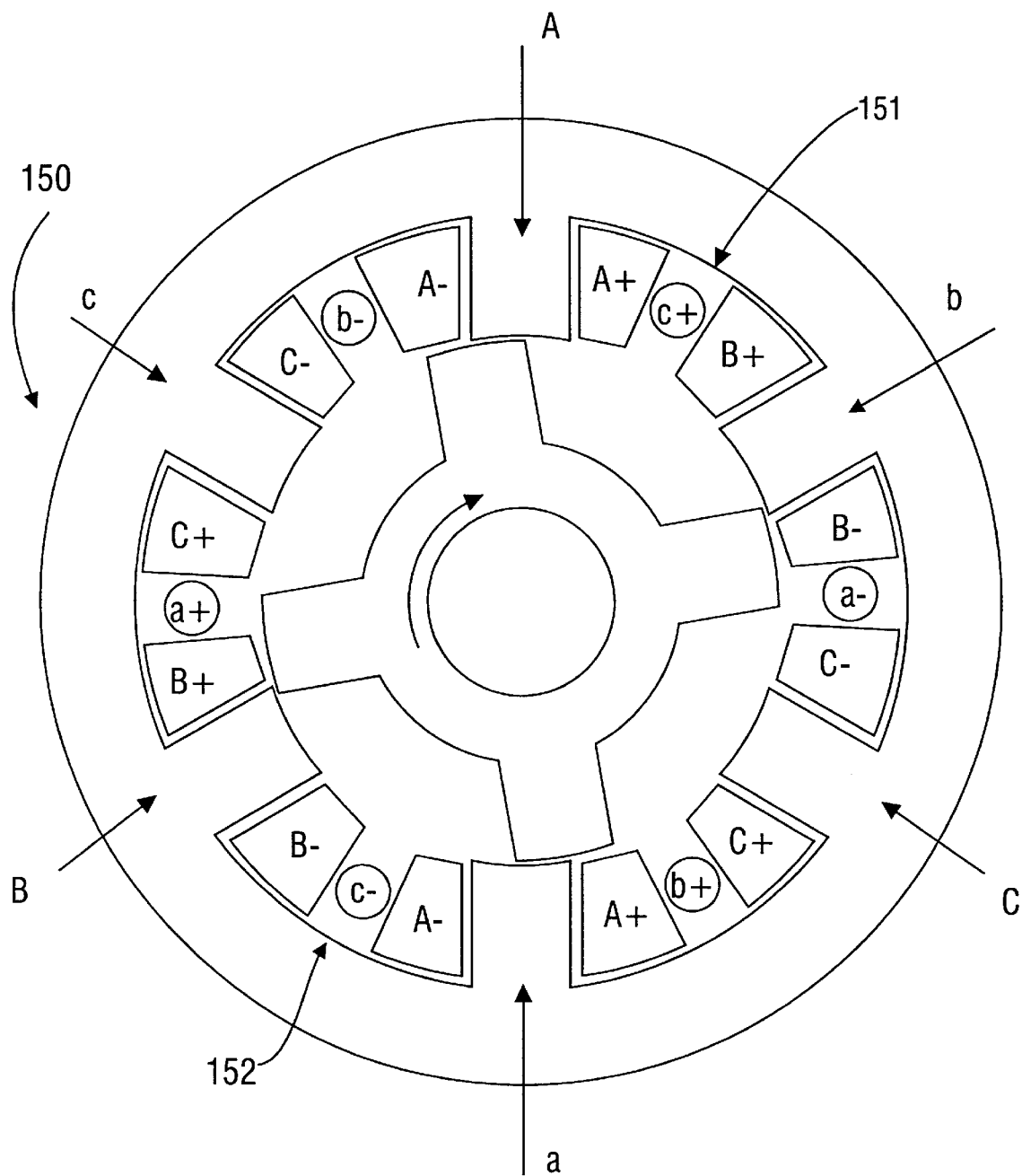
FIG. 15 illustrates a still further alternate embodiment of the machine of FIG. 1.

FIG. 15 illustrates yet still another alternate embodiment of a doubly-fed reluctance machine 150 constructed according to the teachings of the present invention. As with the machines of FIGS. 11 and 13, the phase A, B and C and phase a, b, and c winding are positioned within the stator to produce magnetic fields having orientations as reflected by the arrows in FIG. 15 when positive current is applied to the phase windings.

Figure 16A:
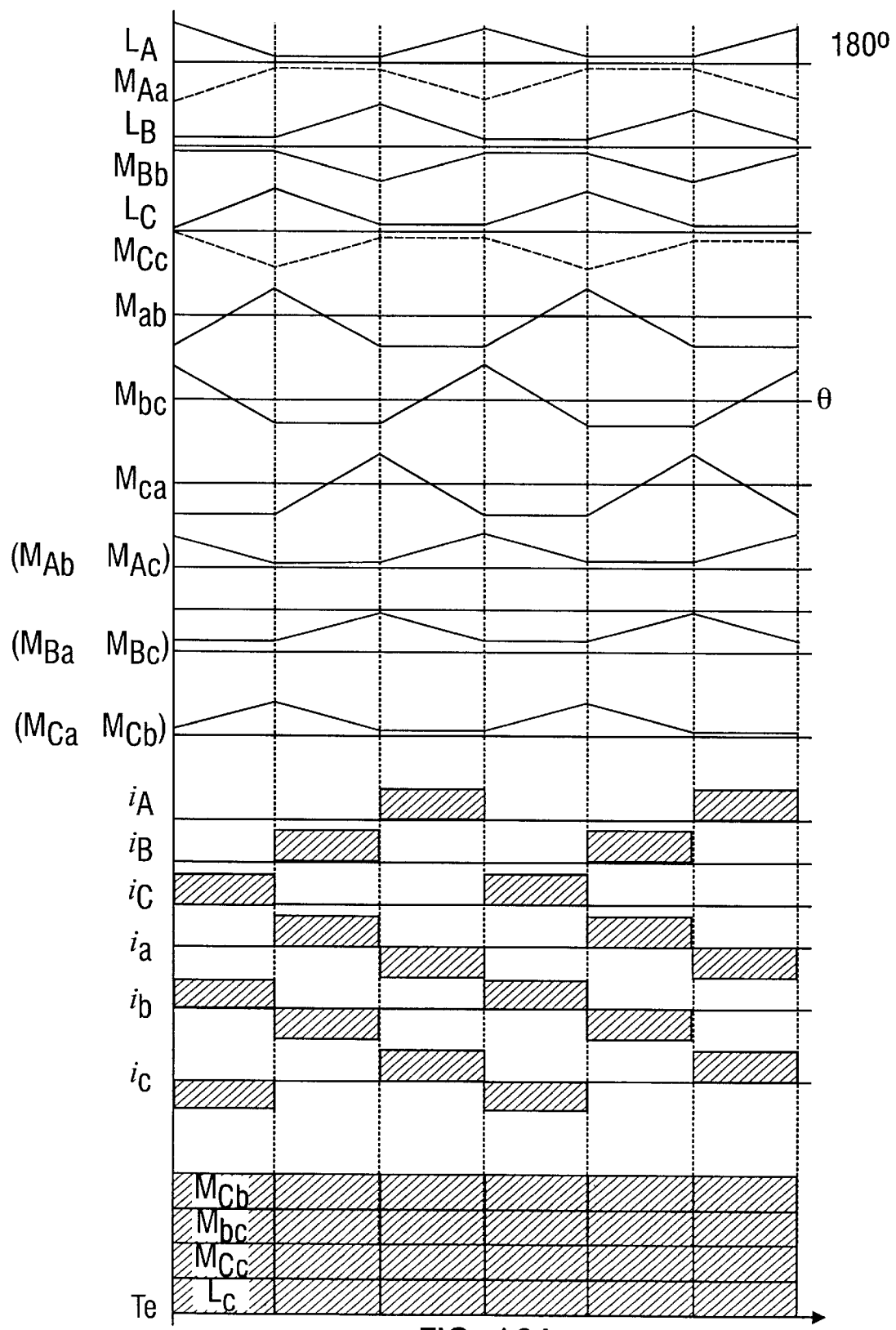
FIGS. 16A and 16B illustrate various inductances and an exemplary energization scheme for the machine of FIG. 15.
Figure 16B:
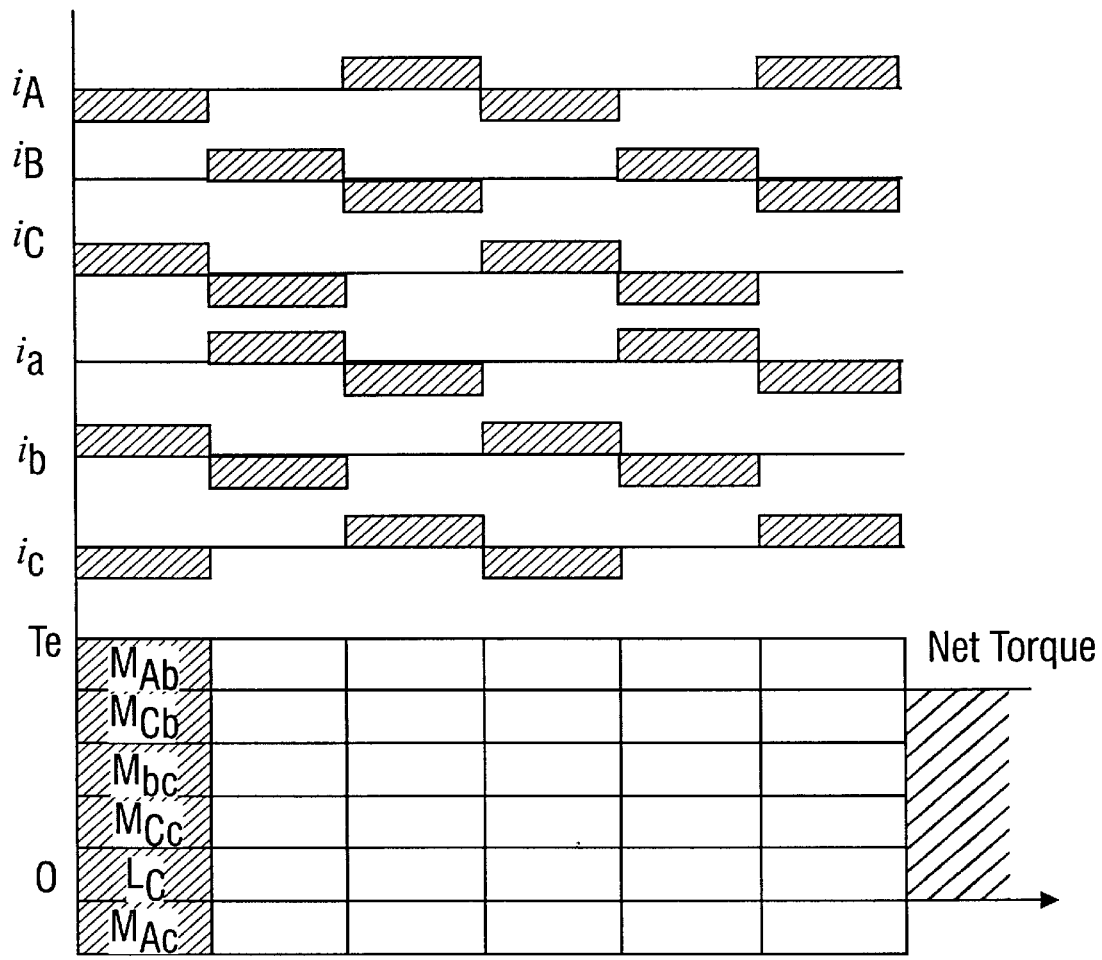

FIG. 16A illustrates idealized self-inductance and mutual-inductance waveforms for machine 150 as well as an energization scheme and the resulting output torque. FIG. 16B shows another energization scheme and the resulting output torque. Winding A current and winding c current have the same timing, winding B current and winding a current have the same timing, and winding C current and winding b current have the same timing. The power converter arrangements use in the doubly fed reluctance machine systems of FIGS. 3 and 8 are suited to implement the energization scheme of FIG. 16A and FIG. 16B, respectively.

As illustrated in FIGS. 15 and 16B all of the currents in each inter-pole region of the stator are in the same direction. This feature of machine 150 allows for an efficient form of machine construction where each inter-pole region of the stator (i.e., each stator slot) contains only two coils, as opposed to the three of four in the previously discussed exemplary embodiments.

Figure 17:
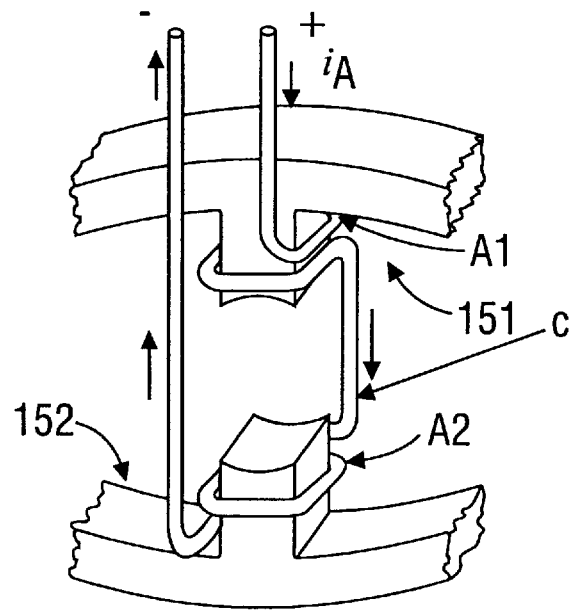
FIG. 17 illustrates an exemplary construction of the windings of the machine of FIG. 15 in which a fully-pitched winding is formed from the same continuous conductor that is used to form the coils of the short-pitched winding with which it shares stator slots.

FIG. 17 illustrates an exemplary construction of the windings of machine 150 in which a fully-pitched winding is formed from the same continuous conductor that is used to form the coils of the short-pitched winding with which it shares stator slots. For example, referring to FIG. 15, it may be noted that slot 151 includes a coil side turn portion from one of the coils of the phase A winding and a coil side turn portion from the phase c winding. Similarly, slot 152 includes a side turn portion from the phase A winding and one from the phase c winding. Moreover, the direction of positive current in the referenced coil side turn portions is the same. Thus, it is possible to construct the coil side turn portions for the phase A winding and the phase c winding from the same continuous conductor. This is generally illustrated in FIG. 17 which illustrates how one continuous conductor can be formed and placed (or wound) in the stator to form the phase A and phase c winding. Only one turn is illustrated for both the short-pitched and the fully-pitched winding. It may be necessary to alter the regularity with which the continuous conductor is brought across the stator (e.g., from slot 151 to slot 152) to ensure that the total number of winding turns in the fully-pitched winding c is the same as that of the short-pitched winding A.

Figure 18:
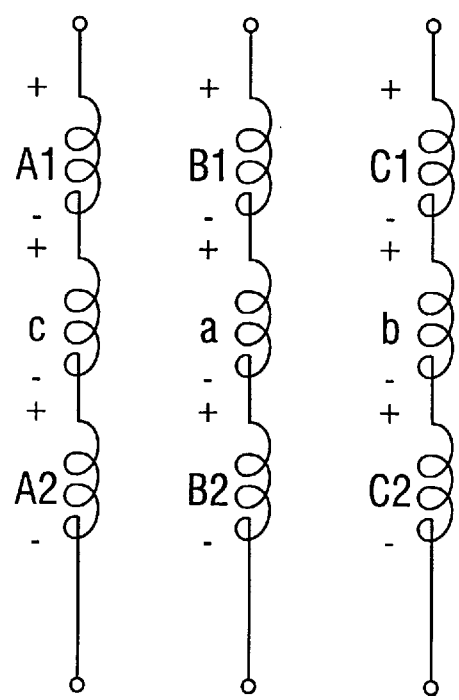
FIG. 18 illustrates the winding configuration that will result if the construction of FIG. 17 is used to construct the machine of FIG. 15.

FIG. 18 illustrates the resulting winding configuration that will result if the winding scheme of FIG. 17 is used to construct machine 150. As illustrated, this winding scheme will result in three "chains" of conductors with one chain including the phase A winding in series with the phase c winding; one including the phase B winding in series with the phase a winding; and one including the phase C winding in series with the phase b winding. Thus, when an individual chain is energized (using any of the power converters of any of FIGS. 3, 6 or 8) one short-pitched and one fully-pitched winding will be energized.

Comparing the exemplary energization scheme of FIG. 16B with the chains of FIG. 18, it may be noted that the energization scheme of FIG. 16B may be easily implemented with the machine of FIG. 18 using any of the drives illustrated in FIGS. 3, 6 or 8.

Figure 19:
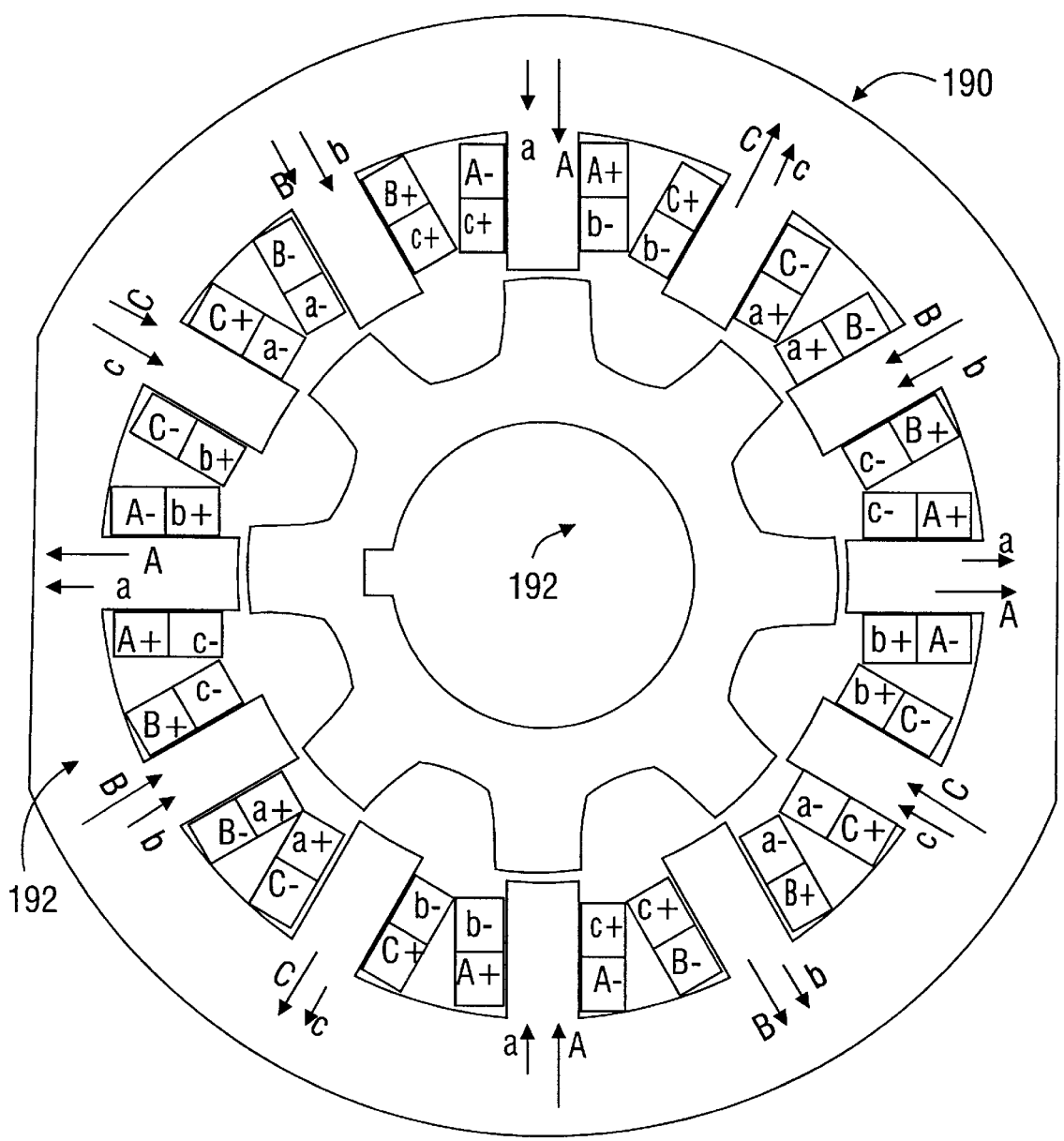
FIG. 19 illustrates an eight rotor pole, twelve stator pole machine constructed according to the teachings of the present invention.

In all of the exemplary embodiments discussed above, the exemplary machines had four rotor poles and six stator poles. The present invention is applicable to machines having different numbers of rotor poles and stator poles. FIG. 19 illustrates one such machine 190 that has an eight pole rotor 191 and a twelve pole stator 192. Three short-pitched phase windings A, B and C are positioned within the stator 192 and three fully-pitched windings a, b and c are also positioned within the stator. The magnetic fields established when positive current is provided to the various phase windings is reflected by the arrows in FIG. 19. The same control techniques and energization schemes described above in connection with the four rotor pole/six stator pole machines may be used to control the eight rotor pole/twelve stator pole machine of FIG. 19.

Figure 20A:
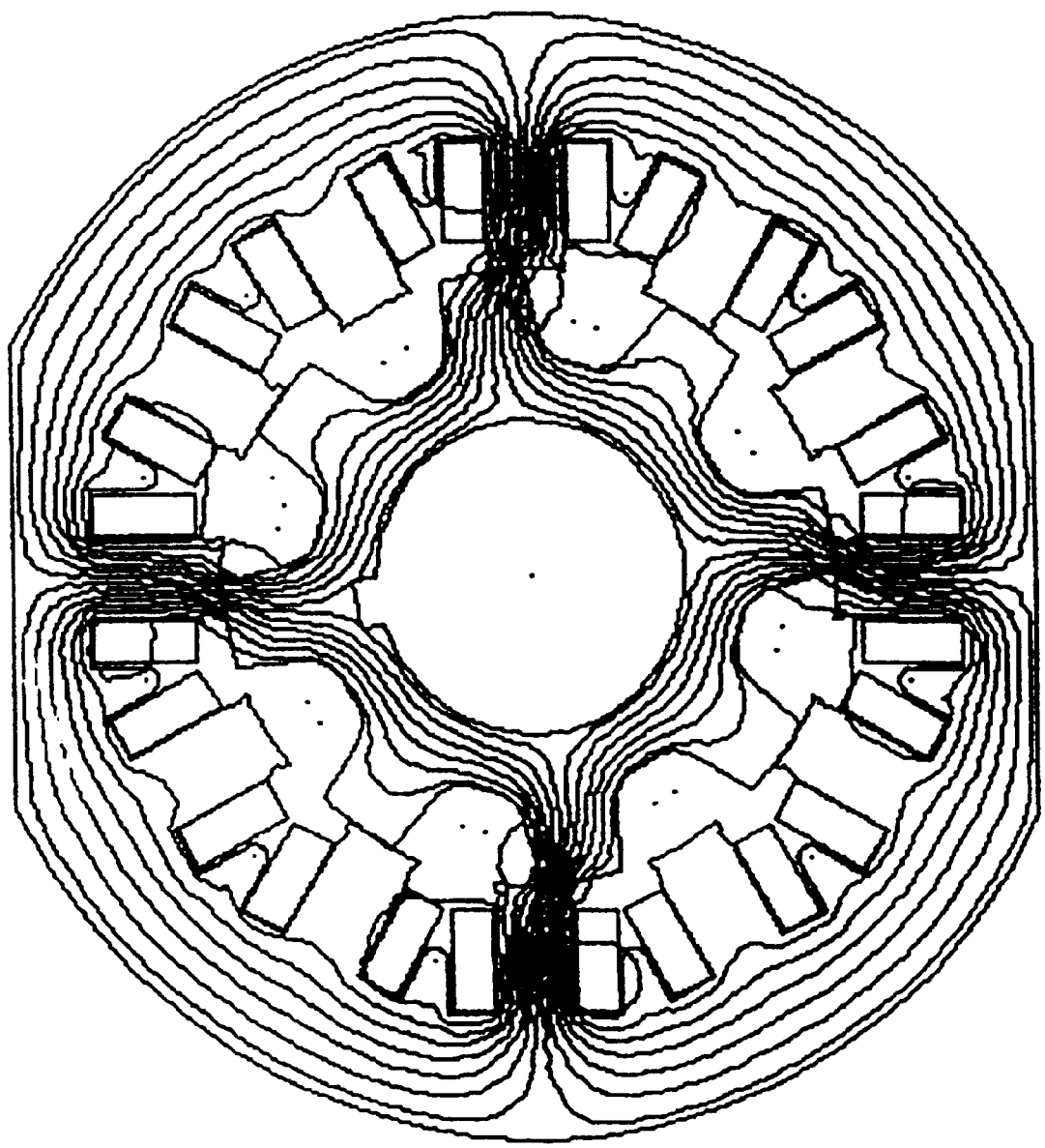
FIG. 20A illustrates the typical flux pattern that will be established in a conventional reluctance machine when the phase A winding only is energized for the illustrated rotor position.
Figure 20B:
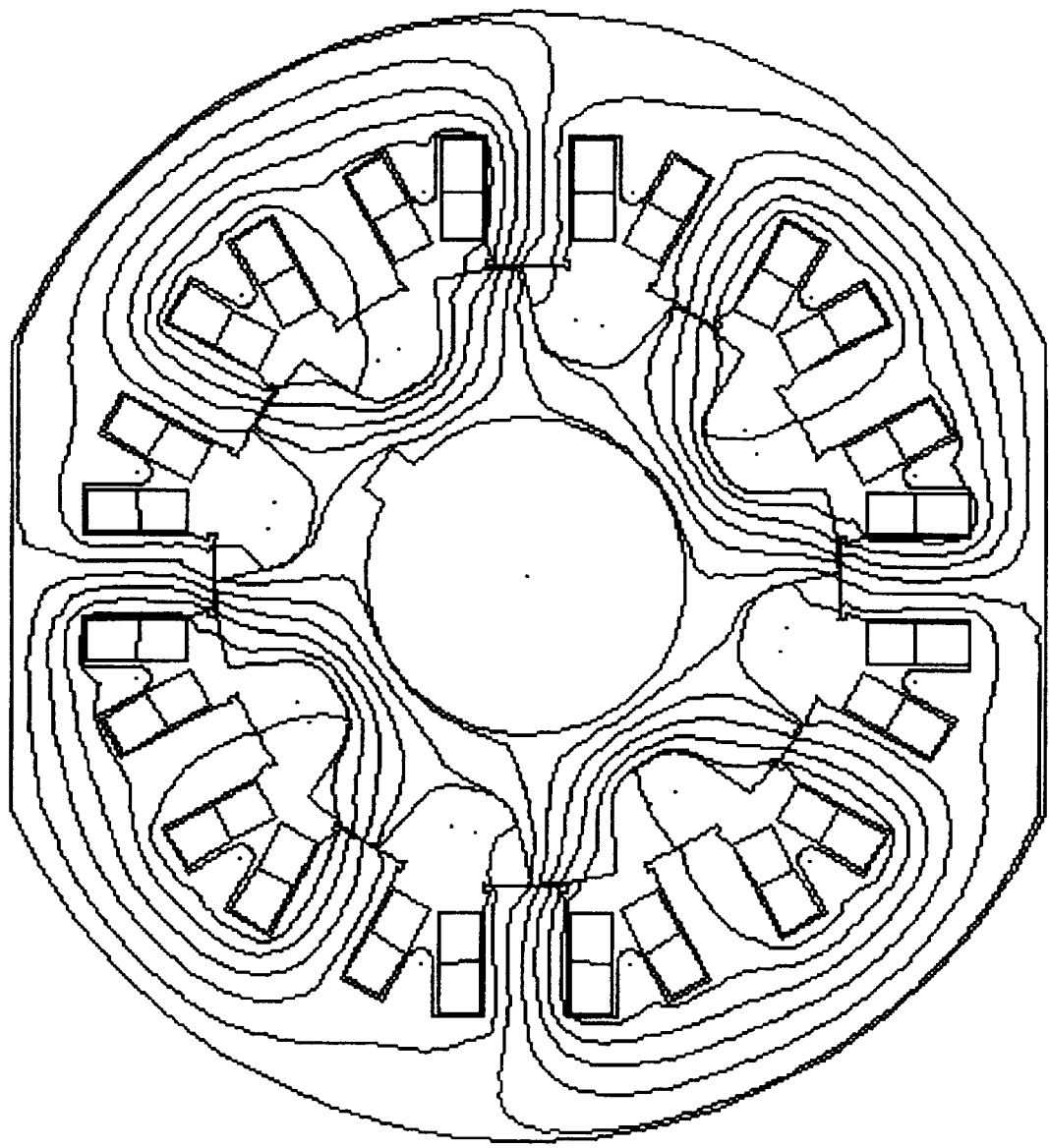
FIG. 20B illustrates the flux pattern of a machine constructed according to the teachings of the present invention where both the phase a and phase A windings are energized for a rotor position corresponding to that of FIG. 20A.

FIGS. 20A and 20B illustrate some of the advantages of constructing a machine according to the teachings of the present invention in the context of the machine 190 having twelve stator poles and eight rotor poles as illustrated in FIG. 19. FIG. 20A illustrates a typically flux pattern that will be established in a traditional reluctance machine when the phase A winding is energized only and the rotor is at a position where rotor poles just begin to overlap with the energized stator poles associated with the phase A winding (e.g., a 9° overlap). As illustrated in the figure, the flux flow through the energized phase windings is extensive and, depending on the magnitude of the current flowing in the phase A winding, will often be limited by the saturation characteristics of the material used to construct the stator. Further, as reflected in FIG. 20A, all of the flux flow in the traditional machine is directed through the energized stator poles, thus contributing to localized saturation of the stator.

FIG. 20B illustrates a machine constructed according to the teachings of the present invention where both the phase A and phase a windings are energized and wherein the rotor is at the same position as that reflected in FIG. 20A. As may be noted from a comparison of the flux lines flowing through the energized phase A stator poles, the flux density of the energized stator poles is less in FIG. 20B than it is in FIG. 20A. Thus, it is possible to either: (i) avoid localized saturation of the stator core at the energized stator poles; or (ii) apply a higher magnitude current to the phase A winding (producing a higher output torque) before the saturation characteristics of the stator material begin to significantly affect the machine's performance.

In addition to illustrating the benefits relating to localized saturation of the stator core, FIGS. 20A and 20B also illustrate the benefit of the present invention in utilizing more of the stator core than is utilized in traditional reluctance machines. This is indicated by the fact that in FIG. 20B, the flux lines pass through: (i) energized stator poles associated with the phase A winding; and (ii) additional stator poles. The flux flow through the other stator poles is a consequence of the mutual coupling between the phase A and phase a windings. This flux flow through additional stator poles both provides for a higher output torque than available from conventional machines and utilizes more stator core material, thus increasing the overall efficiency of the machine.

Figure 21:
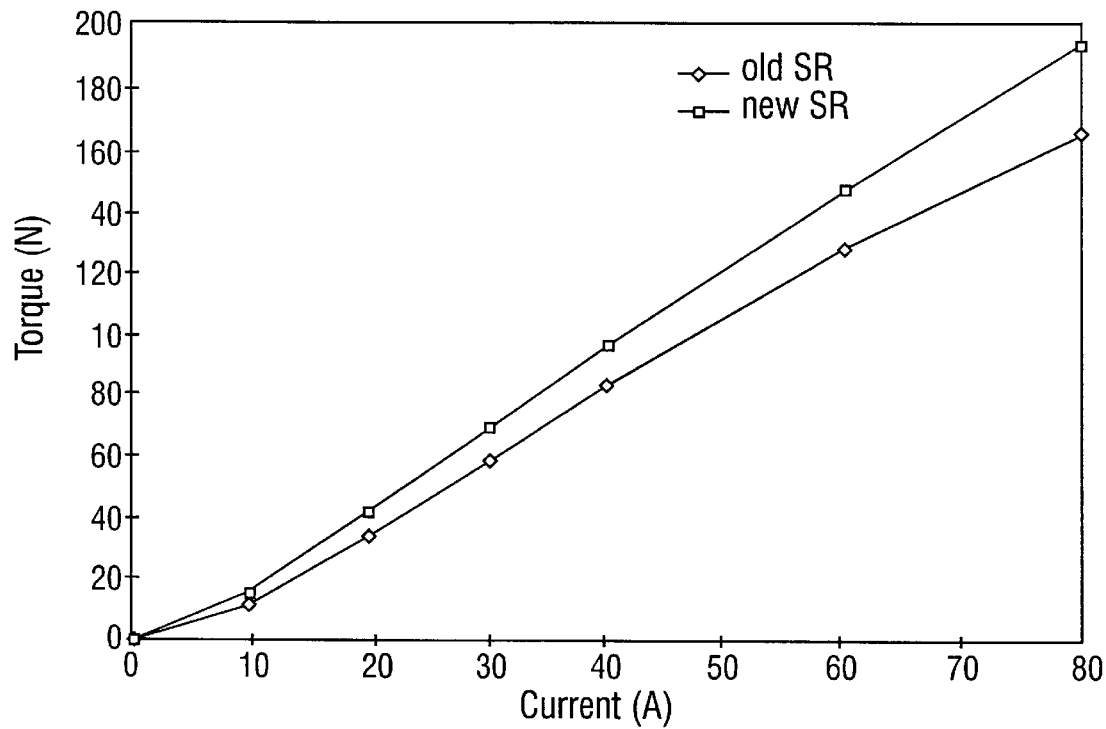
FIG. 21 illustrates the maximum output torque capability as a function of the energization current from a conventional machine and a machine constructed according to the teachings of the present invention.

FIG. 21 provides an indication of the degree to which the teachings of the present invention may be used to increase the total torque output of a reluctance machine. Specifically, FIG. 21 illustrates the maximum torque output capability as a function of energization current for: (i) the conventional reluctance machine of FIG. 20A; and (ii) the reluctance machine constructed and energized according to the teachings of the present invention as illustrated in FIG. 20B. As FIG. 21 clearly illustrates, for all values of phase energization current, the torque output capability is greater for the machine constructed according to the teachings of the present invention than the conventional reluctance machine. Moreover, the difference between the novel machine of the present invention and the conventional machine grows more and more significant as the magnitude of the energization current increases and the saturation characteristics of the stator material begin to significantly impact motor performance.

The use of fully-pitched and/or fractional pitched windings in the previously describe exemplary machines of the present invention allows for an improved "sensorless" rotor position detection scheme to be implemented. One example of this novel scheme is generally reflected in FIGS. 22A–22C.

FIG. 22A generally illustrates the phase energization currents associated with the exemplary energization scheme of FIG. 9A as applied to the machine of FIG. 1. The self- and mutual-inductances for such a machine are illustrated in FIG. 9A.

Comparing the mutual inductance waveforms with the exemplary current excitation scheme, it may be noted that the switching points for each of the phase windings correspond to the points where the rate of change (or slope) of the mutual-inductance between the unenergized fully-pitched winding and the energized short-pitched winding changes signs. For example, from the 0 degree rotor position to near the 30 degree rotor position, fully-pitched windings b and c are energized as is the phase B and phase C windings. Thus, during this interval the phase A winding is unenergized. Looking at the mutual-inductance $M_{Ca}$ between the energized phase C winding and the unenergized phase a winding it may be noted that over the entire 0–30 degree interval this mutual-inductance $M_{Ca}$ is decreasing such that the slope of this mutual inductance is negative. At the 30 degree rotor position, however, the slope of this mutual-inductance $M_{Ca}$ changes sign as $M_{Ca}$ begins to increase. This change in sign corresponds to a switching point in the exemplary energization scheme wherein the previously unenergized fully-pitched phase a winding is to be energized. Also at this point the phase C winding is to be de-energized and the other phase, phase B, should start to reverse its current direction.

If the same procedure is followed for the 30–60 degree interval (e.g., monitoring the mutual inductance between the unenergized fully-pitched phase winding c and the energized phase B winding) it may be noted that at the point where slope of $M_{Bc}$ changes sign, the 60 degree point, the previously unenergized fully-pitched winding c is to be energized and the other phase, phase A, should start to reverse its current direction. This same pattern exists with respect to all of the rotor position intervals illustrated in FIG. 22A.

Because of the relationship between the mutual-inductance waveforms discussed above and the exemplary switching scheme of FIG. 22A it is possible to indirectly detect the various mutual inductances such that the changes in the sign of the slope of the mutual inductances can be used to control the switching of the drive circuits and a separate rotor position transducer can be eliminated. This indirect monitoring can be accomplished by detecting, for each rotor position interval, the induced voltage in the unenergized fully pitched phase winding (which is the next fully-pitched phase to turn-on) and implementing an appropriate switching act when the sign of the detected induced voltage begins to change. This switching scheme is possible because the induced voltage in the unenergized fully-pitched windings directly corresponds to the mutual-inductance between the unenergized fully-pitched winding and the energized short-pitched winding and the mutual-inductances between the unenergized fully-pitched winding and the energized fully-pitched windings. This switching scheme also takes advantage of the discovery that the changes in the sign of the induced voltage in the unenergized fully-pitched phase winding occur when the rotor and stator poles for the energized short-pitched phase winding are in alignment (which is the position where a switching act should occur according to the idealized examples). The knowledge of this alignment position provides a reference rotor position based on which switching angle control can be implemented when the switching acts do not necessarily occur at the alignment positions.

Notably this method is based on the detection of changes in the sign of the induced voltage and not on the magnitude of the induced voltage. Thus, even at low rotor speeds where the magnitude of the induced voltage is low, this scheme may be effectively implemented since the magnitude of the induced voltage is not critical.

FIG. 22B illustrates the voltages Va, Vb and Vc that may be detected on the three fully-pitched phase windings over 180 electrical degrees of rotor rotation. Using the phase a winding as an example, it may be noted that over the 0–30 degree interval (the interval over which the phase a winding is un-energized according to the energization scheme of FIG. 22A) the detected voltage for the phase a winding is slightly negative over the majority of the 0–30 degree interval. The reasons for this is that, in general, the voltage that may be detected on the phase A winding will be equal to:

$$\frac{d}{dt}(M_{Aa}i_A + M_{Ba}i_B + M_{Ca}i_C + M_{ab}i_b + M_{ca}i_c + L_a i_a).$$

Over essentially all of the 0–30 degree interval, the current in the phase A and phase a windings is zero, thus, there is no voltage contribution from the first and last components of the previous equation. Further, over the 0–30 degree interval changes of $M_{Ba}$ and $M_{ca}$ are negligible such that there is no significant voltage contribution from those components of the previous equation. Moreover, over essentially all of the 0–30 degree interval, $$\frac{d}{dt}M_{Ca}$$

is negative while $i_C$ is positive, thus there is a negative voltage contribution over most of the 0–30 degree interval from the third component of the previous equation. Furthermore, over the same portion of the 0–30 degree interval, $d/dt M_{ab}$ is positive while ib is negative, resulting in a further negative contribution from the fourth component to the voltage on the phase a winding. Thus, over most of the 0–30 degree interval the voltage on the phase a winding is slightly negative.

As the rotor approaches the rotor position corresponding to the 30 degree position, the slope in the mutual inductance between the unenergized phase a winding and the energized phase C winding begins to change from negative to positive. Thus at this point, there will be a positive voltage contribution to Va from the third component. At the same time, the slope in the mutual inductance between the phase a winding and the energized phase b winding changes from positive to negative such that there is a positive contribution to the Va voltage from the fourth component. Finally, at the same time, the mutual inductance between the phase a winding and the energized phase c winding begins to increase from essential constant, such that there is a positive contribution to the Va voltage from the fifth component. Accordingly, near the 30 degree point the voltage Va will transition from a slightly negative value to a positive value. The point at which this transition occurs essentially corresponds to the point in the energization scheme of FIG. 22A where: (i) the phase A and phase a windings are to be switched on negative; (ii) the current in the phase B and phase b windings is to change polarity (i.e., be negated); and (iii) the phase C and phase c windings are to be de-energized. Accordingly, by monitoring the voltage of the phase a winding over the 0–30 degree interval it is possible to determine approximately when the next switching act should occur or to provide a reference rotor position without the need of a rotor position transducer.

While the previous discussion focused on the phase a winding over the 0–30 degree interval, it will be apparent to those of ordinary skill in the art having the benefit of this disclosure that a similar voltage may be detected for the other un-energized phase b and phase c windings for the same reasons described above. Thus, by monitoring the voltages on the un-energized phase a, b and c windings of a machine constructed according to the teachings of the present invention it is possible to eliminate the necessity for, cost of, and space required by a rotor position transducer.

The appropriate switching acts that should occur in response to the detection of sign changes in the induced voltage in the unenergized fully-pitched phase windings to implement the exemplary energization scheme of FIG. 22A are illustrated in FIG. 22C. FIG. 22C illustrates, for each rotor position interval; (i) the unenergized fully-pitched winding to be monitored; (ii) the phase windings that should be energized at each switching point; (iii) the phase windings that should be de-energized at each switching point; and (iv) the phase windings for which the polarity of the current should be changed. In particular, FIG. 22C illustrates a method indicating what un-energized winding voltage (Va, Vb or Vc) should be monitored over each interval of rotor rotation and the switching events (turn-on, turn-off or negate) that should occur when the monitored voltage transitions from a negative value to a positive value.

Figure 23A:
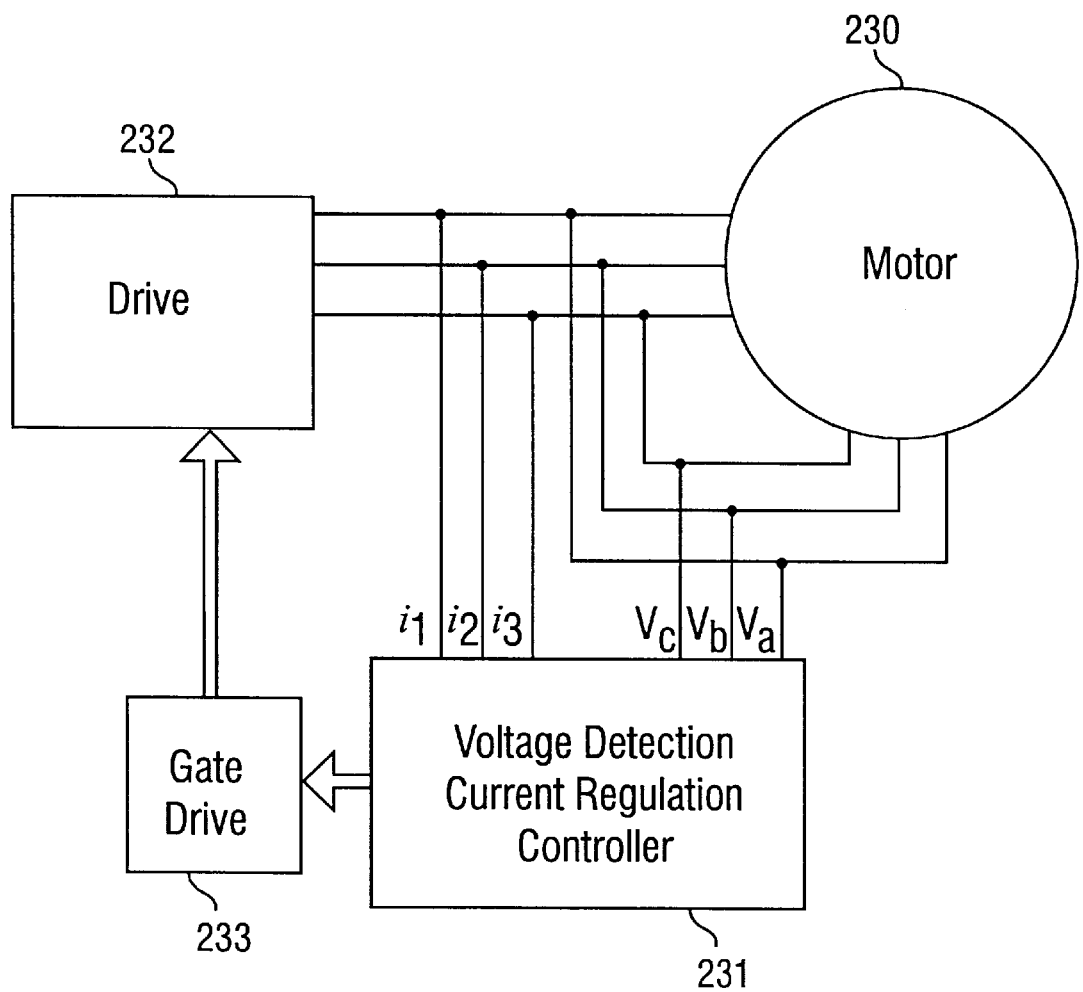
FIGS. 23A, 23B, 23C, 24A and 24B generally illustrate a control system that may be used to implement the sensorless switching scheme of FIG. 22C.

FIG. 23A generally illustrates a motor system for implementing the sensorless switching scheme described above. Generally, the system includes a motor 230 and a drive 232 constructed according to the teachings of the present invention. The motor may be constructed in accordance with FIG. 1 and the drive may be constructed in accordance with FIG. 8 although other motors and drives may be used. The motor 230 internal connection scheme shown in FIG. 10C is used as an example for illustrative purposes. A voltage detection current regulation controlled device 231 receives feedback signals $V_a$, $V_b$, and $V_c$ indicative of the voltage in the fully-pitched windings a, b and c. The voltage detection process also receives within the device 231 switching signals indicative of the state of the power switching devices in the drive 232. These switching signals contain information indicating which of the fully-pitched phase windings is unenergized. In response to the switching signals, the voltage detection process selects and detects one of the voltages associated with the unenergized fully-pitched phase winding and provides an output pulse when the selected voltage changes sign. The output pulses from the detection process are provided to the current regulation process to generate the switching signals. The voltage detection current regulation controller device 231 will be further detailed later. The appropriate switching signals are further processed and isolated by the gate driver 233 to control the drive 232 to provide the appropriate phase energization currents.

Figure 23B:
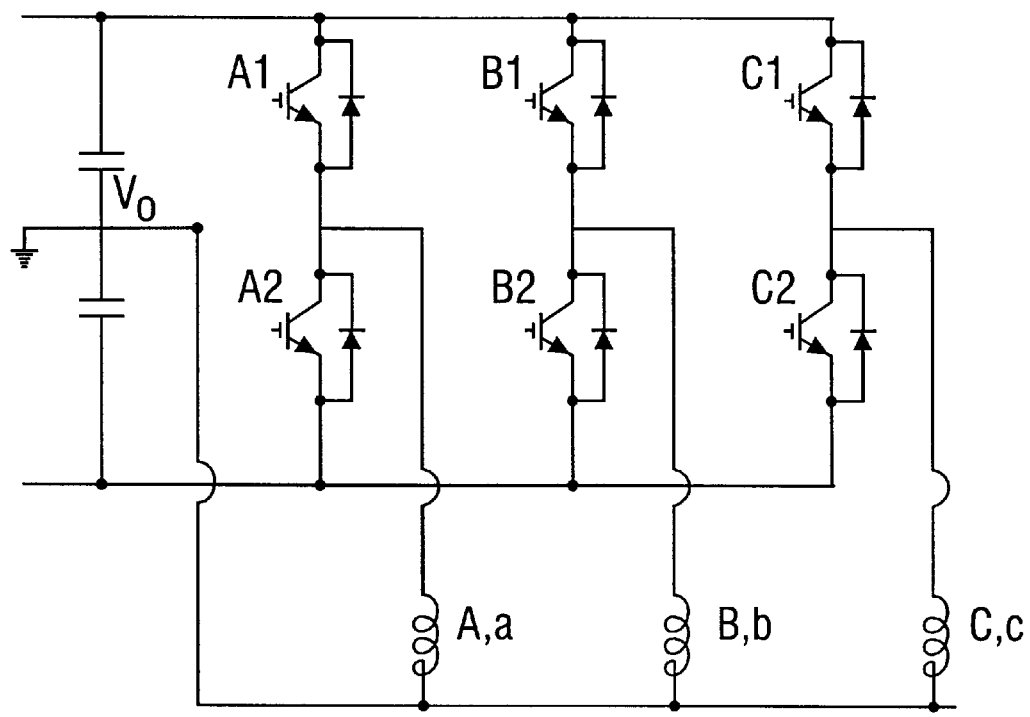
Figure 23C:
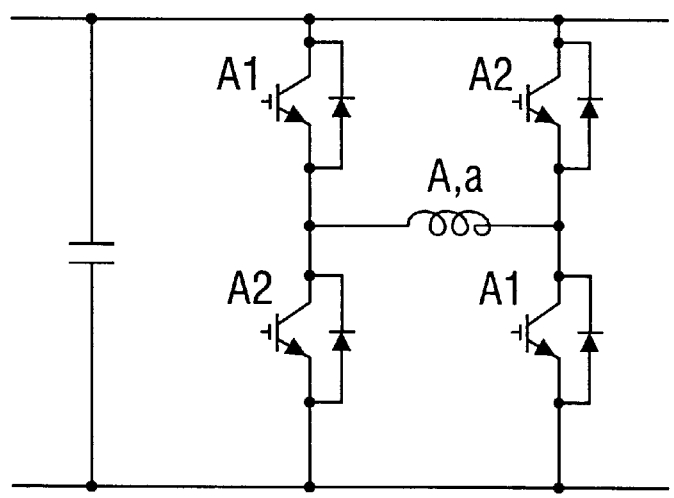

FIGS. 23B and 23C illustrate various forms that the inverter portion of drive 232 may take. In FIG. 23B the drive 232 comprises a six-switching device drive where each of the phase windings A, a, B, b and C, c is coupled to the junction between two of the power switching devices and to a common point Vo that is formed at the junction of a split-capacitor circuit. As those skilled in the art will appreciate, by appropriately controlling the switching devices it is possible to establish positive and negative currents in the phase windings. FIG. 23C illustrate a portion of an alternate to the drive of FIG. 23B wherein each phase winding pair A, a, B, b or C, c is associated with a four switching device H-bridge where the switching devices are operated in pairs to establish positive or negative current in the phase windings. The construction of a full H-bridge drive will be well within the ability of one of ordinary skill in the art having the benefit of this disclosure.

Figure 24A:
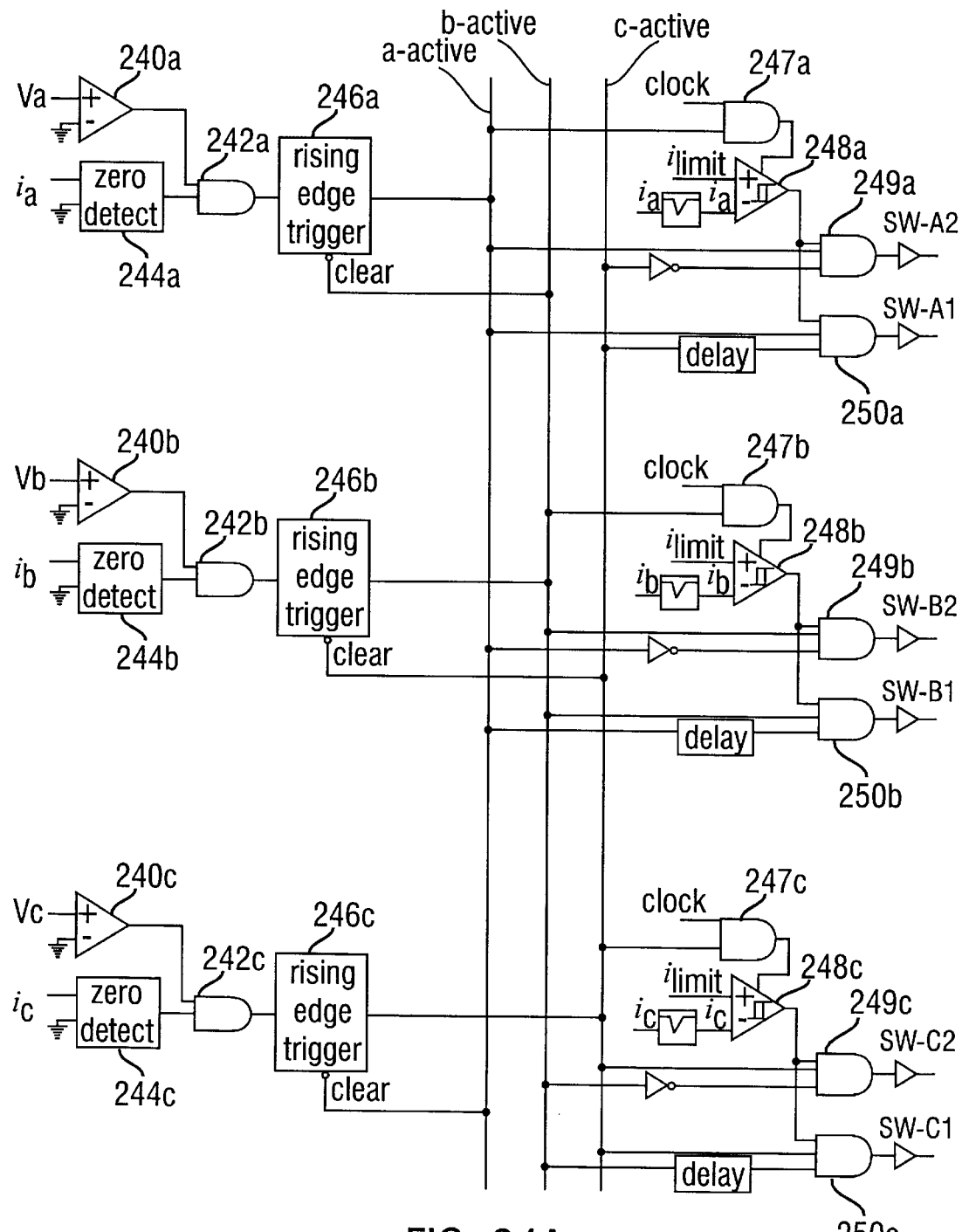

FIG. 24A illustrates one exemplary construction of the relevant portions of voltage detection and current regulation controller 231 that may be used to implement the sensorless control scheme reflected in FIG. 22C. Specifically, FIG. 24A illustrates schematically a circuit for monitoring the appropriate voltages and currents on the motor phase windings and for controlling the gate drive 233 and drive 232 to implement the switching acts reflected in FIG. 22C. Although FIG. 24A illustrates the various functions of the exemplary controller 231 in terms of specific hardware elements, those of ordinary skill in the art will appreciate that the same functionality can be obtained by properly programming a microprocessor through appropriate software or combining hardware and software elements to implement the illustrated and described functions.

The switching scheme of FIG. 22C implemented by the circuitry of FIG. 24A performs several functions and, in particular, both indirectly detects the rotor position through the sensorless technique described above and implements the appropriate commutation steering of the phase windings. In the illustrated circuit, the commutation switching is based, in part, on the inter-locking and interdependence between the phases provided for by the energization scheme of FIG. 22C. Specifically, in the switching scheme of FIG. 22C, many of the switching events are inter-locked. For example, at the point where Va experiences a large rising pulse (e.g., near the 30 degree position): (i) the phase A and a windings are energized with negative current; (ii) the phase C and c windings are de-energized, and (iii) the voltage applied to the phase B and b windings is negated (e.g., the applied voltage goes from negative to positive). Thus, these three switching acts are inter-locked. The circuitry of FIG. 24A takes advantage of the inter-locked nature of the switching events in the scheme of FIG. 22A.

Because the general operation of the circuitry of FIG. 24A is the same for each of the three phases, the operation of the circuit will be discussed in detail only in connection with the detection of voltage on the unenergized phase A and a windings. The operation of the circuitry with respect to the other windings will be apparent to one of ordinary skill in the art having the benefit of this disclosure.

Referring to FIGS. 22A–22C it may be noted that the voltage in the un-energized phase a winding is monitored over the 0–30 degree interval. Over this interval the current in the phase A and phase a windings is approximately zero, and the induced voltage on the phase a winding slightly negative. It is when: (i) the current in the phase a winding is zero; and (ii) the induced voltage on the phase a winding transitions from a negative value to a positive value that the interlocked switching acts described above occur.

To implement the described functionality, the circuitry of FIG. 24A includes a comparator (differential amplifier) 240a having a positive input coupled to receive the induced voltage on the a winding and a negative or ground input coupled to reference ground. Similar amplifiers 240b and 240c are provided for the phase b and c windings. In operation, the amplifier 240a will produce an output corresponding to a logic 1 whenever the detected voltage Va is greater than the reference voltage (which corresponds to approximately zero volts). The output from the operational amplifier 240a will be zero at all other times. The output from the operational amplifier 240a is provided as one input to a two-input AND gate 242a. Similar AND gates are provided for the phase b and c windings.

The second input to the two input AND gate 242a is provided by a zero current detector 244a that receives as inputs the detected current from the phase a winding and a signal corresponding to the reference voltage. In general, zero current detector 244a will provide a logic 1 output when the input current Ia is zero and a logic 0 output at all other times. Similar zero current detectors 244b and 244c are provided for the phase b and c windings.

The output of AND gate 242a will generally be at a logic zero level but will become a logic 1 level when: (i) the current in the phase a winding is zero; and (ii) the induced voltage on the phase a winding transitions from a negative value to a positive value. Notably, this transition from a logic 0 level to a logic 1 level corresponds to the point where one set of interlocking switching acts should occur. The output from the AND gate 242a is provided as an input to a rising-edge triggered device 246a, whose output will be set to a logic 1 in response to receiving a logic 1 at its input. The output of rising-edge triggered device 246a will remain a logic 1 until the device 246a is cleared by receiving a positive pulse at its clear input. The output of device 246a is coupled to an "a-active" bus. As described below, the a-active bus is at a logic 1 level during the intervals over which the phase a (and phase A) windings are receiving energizing current.

Similar edge-triggered devices 246b and 246c, and similar active buses, b-active bus and c-active bus, are provided for the phase b and c windings.

The a-active bus is coupled as one input to an AND gate 247a that also receives as an input the output of a clock that is running at a frequency preferably in the range of 1 kHz. to 20 kHz. The AND gate 247a will thus produce an output that is constantly zero when the a-active bus is logic zero or an output that varies from logic 0 to logic 1 at a rate corresponding to the clock frequency when the a-active bus is logic 1. Similar AND gates 247b and 247c are provided for the phase b and c windings.

The output from AND gate 247a is provided as a control input to a hysteresis comparator 248a. Comparator 248a will be controlled to perform a comparison of its inputs only when the control input received from the AND gate 247a is a logic 1. The inputs to comparator 248a are: (i) a signal corresponding to the absolute magnitude of the phase a current, Ia, and (ii) a desired phase a current limit $I_{limit}$. The comparator 248a will compare its two inputs and, if the difference between the inputs is greater than the set hysteresis value, produce a logic 1 output (when $I_{limit}$ is greater than Ia by the appropriate amount) or a logic 0 output (when $I_{limit}$ is less than Ia by the appropriate amount). Thus, comparator 248a may be used to control the magnitude of the current in the phase A and a windings such that the current is approximately equal to the $I_{limit}$ value. Through this technique, the torque output of the machine may be controlled.

Those of ordinary skill in the art will appreciate that the hysteresis current control method described above is but only example of a current control circuit that may be used to implement the present invention. Alternate current control circuits, such as bang-bang circuits, pulse width modulation, pulse frequency modulation, voltage and duty cycle control, current delta control method, may be used without departing from the scope and spirit of the present invention.

In the embodiment of FIG. 24A, the current limit signal $I_{limit}$ can be derived from a look-up value in a look-up table corresponding to a particular torque demand.

The output of the hysteresis comparator 248a is provided to a logic switching circuit comprising three-input AND gates 249a and 250a. Both the three-input AND gates 249a and 250a receive as inputs: (i) the output from hysteresis comparator 248a; (ii) the a-active bus. Accordingly, both AND gates 249a and 250b will be active (i.e., able to produce both logic 1 and logic 0 values) only when the a-active signal is asserted and the output from the hysteresis comparator 248a is a logic 1. The third-input to AND gate 249a is the inversion of the c-active bus and the third input to the AND gate 250a is a delayed version of the c-active bus. Accordingly, AND gate 249a will be active when the previously-described conditions are met and the c-active bus is logic 0. Conversely, after the delay period has timed out, AND gate 250a will be active when the previously-described conditions are met and the c-active bus is logic 1.

Because of the use of both the c-active bus and the inverted c-active bus, only one of the AND gates 249a or 250a will be active at any given time. The output from AND gate 249a (SW-A2) is applied to the gate driver corresponding to the switching device A2 of the drive 232 and the output from AND gate 250a (SW-A1) is applied to the gate driver of the corresponding switching device in the drive 232.

From the above it should be clear that the switching devices SW-A2 and SW-A1 will be modulated by the previously described circuitry such that, when Ia is zero and the voltage Va transitions from a negative value to a positive value, the phase a (and A) winding will be energized with current to a level corresponding to the Ilimit value. The polarity of the current applied to the phase a (and A) winding will depend on the state of the c-active bus. If the c-active bus is at a logic 1 value then the current applied to the phase a (and A) winding will be positive, otherwise the current applied will be negative. The use of the c-bus to control the polarity of the current applied to the phase a (and A) windings results from the inter-locked nature of the switching scheme set forth in FIG. 22A.

Circuitry corresponding to the AND gates 249a and 250a is provided for the phase b and c windings. The inputs to the AND gates 249b, 249c, 250b and 250c differ from those of 249a and 250b to implement the switching scheme of FIG. 22C. The construction of such circuits will be apparent to those of ordinary skill in the art having the benefit of this disclosure.

As described above, near the 30 degree position, the above-described a-active bus will become active and the circuitry described above will begin to modulate the switching devices coupled to the phase a and A windings to apply negative current to the phase a and A windings. At that same 30 degree point, the transition of the a-active bus from a logic 0 level to a logic 1 level will clear edge-triggered device 246c, thus causing the c-active bus to transition from a logic 1 level to a logic 0 level. This change in state of the a-active bus will also result in the power being applied to the phase b and B windings to transition from negative current to positive current.

As the rotor reaches a point near the 60 degree position, the voltage at Vc will transition from negative to positive, thus setting device 246c and causing the c-active bus to transition from a logic 0 level to a logic 1 level. This transition in the c-active bus will render switch SW-A2 inactive and, after a delay, will render switch SW-A1 active to begin to provide positive current to the phase a and A windings. The delay is provided to avoid the shoot-through of the phase A and a converter leg, and during the delay interval current will freewheel through the diode of switch A1. The transition of the c-active bus will also result in the initiation of negative current to the phase c and C windings and the de-energization of the phase b and B windings.

When the rotor then rotates to a position near the 90 degree position, the detected voltage on the phase b winding will transition from negative to positive thus causing the b-active bus to transition from logic 0 to logic 1 which will: (i) reset the device 246a causing the a-active bus to transition from logic 1 to logic 0 thus de-energizing the phase a and A windings; and (ii) cause a change in state of the switching devices 249c and 250c such that the current applied to the phase c and C windings transitions from negative to positive.

Figures 25A, 25B:
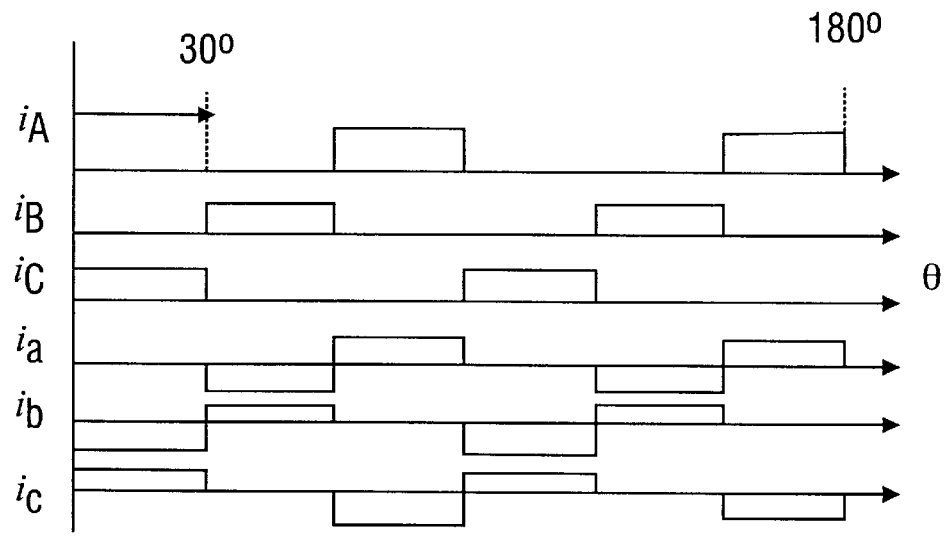
FIGS. 25A and 25B illustrate an alternate sensorless switching scheme and the corresponding phase currents that may be implemented according to certain teachings of the present invention.

The above described circuitry in FIG. 24A is but one example of a circuit that may be used to implement the sensorless switching scheme of the present invention. Alternate circuits may be used to implement the same switching scheme of FIG. 22C without departing from the present invention and alternate circuits may be used to implement alternate sensorless switching schemes without departing from the present invention. In particular, the specific switching sequence implemented by the switching controller may vary from that previously described depending on the drive used to implement the sensorless switching system and the energization scheme that is being implemented. For example, the switching controller may be used in a sensorless system including a drive like that in FIG. 3 to implement the energization scheme of FIG. 2B. In such an embodiment, the energization currents of FIG. 25A should be used and the switching controller should be constructed to implement the switching sequence of FIG. 25B. Alternately, the sensorless circuitry may be used with a drive like that illustrated in FIG. 6 to implement the switching scheme of FIG. 7A. In such an embodiment a different switching sequence should be implemented by the switching controller.

In the previously described circuitry of FIG. 24A the detection of the appropriate voltage transition was used to initiate one or more switching events. Alternate embodiments are envisioned where the detection of the referenced voltage transition is used, not to immediately initiate a switching event, but to provide a known reference mark corresponding to a particular rotor position. In such embodiments, the sensorless scheme described above can be used to implement "angle control" where the rotor angle at which the phase windings are energized can vary depending on various parameters including the speed and torque demand of the machine. In such embodiments, detection of the rotor position, through the sensorless scheme described above, may be used to trigger a timer (or other appropriate circuit) which can be monitored as an indication of the rotor's position relative to the stator. Depending on this "sensorless" derived rotor position, angle control of the phase windings may be implemented, such angle control embodiments may encompass periods of freewheeling.

Angle control, and circuits for implementing angle control schemes based upon representations of rotor position are generally known in the art and will not be discussed herein in detail. The application of the sensorless techniques described herein to derive a representation of the rotor position will be apparent to those of ordinary skill in the art having the benefit of this disclosure.

Figure 24B:
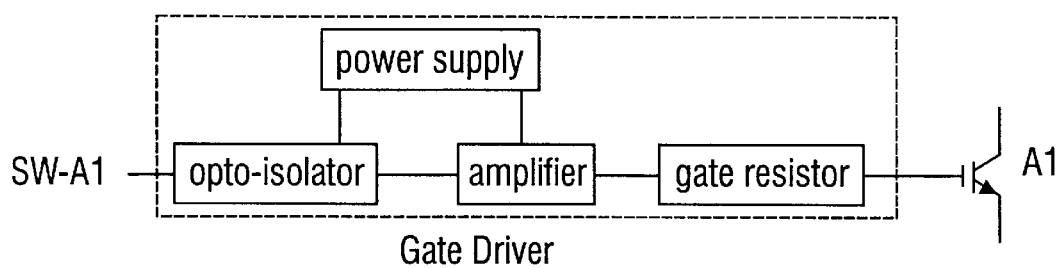

FIG. 24B illustrates one example of a gate driver 233 that may be used to implement the system of FIG. 23A. In general, a switching signal from one of the three-input AND gates 249 or 250 is provided as an input to an opto-isolator whose output is amplifier and applied via a gate resistor to a corresponding power switching device in drive 232. Those of ordinary skill in the art will appreciate that the driver 233 is but one example of a driver circuit that may be used to implement the present invention and that, in certain applications, the driver circuit can be eliminated entirely and the outputs from the three-input AND gates used to directly control the power switching devices in the drive.

The novel sensorless control scheme described above is not limited to machine like that of FIG. 1 that include both short-pitched and fully-pitched windings. The novel control scheme of the present invention is also applicable to reluctance machines including short-pitched and fractional pitched windings (i.e., a winding encircling more than one stator pole but less than the total number of phases). In such a machine, the voltage on an unenergized fractional-pitched winding may be monitored and the changes in the sign of that voltage used to implement an appropriate switching scheme. The sensorless control scheme of the present invention is also applicable to machines that do not include any short-pitched windings but only include either fully-pitched windings, fractional-pitched windings, or a combination of the two.

Figure 26:
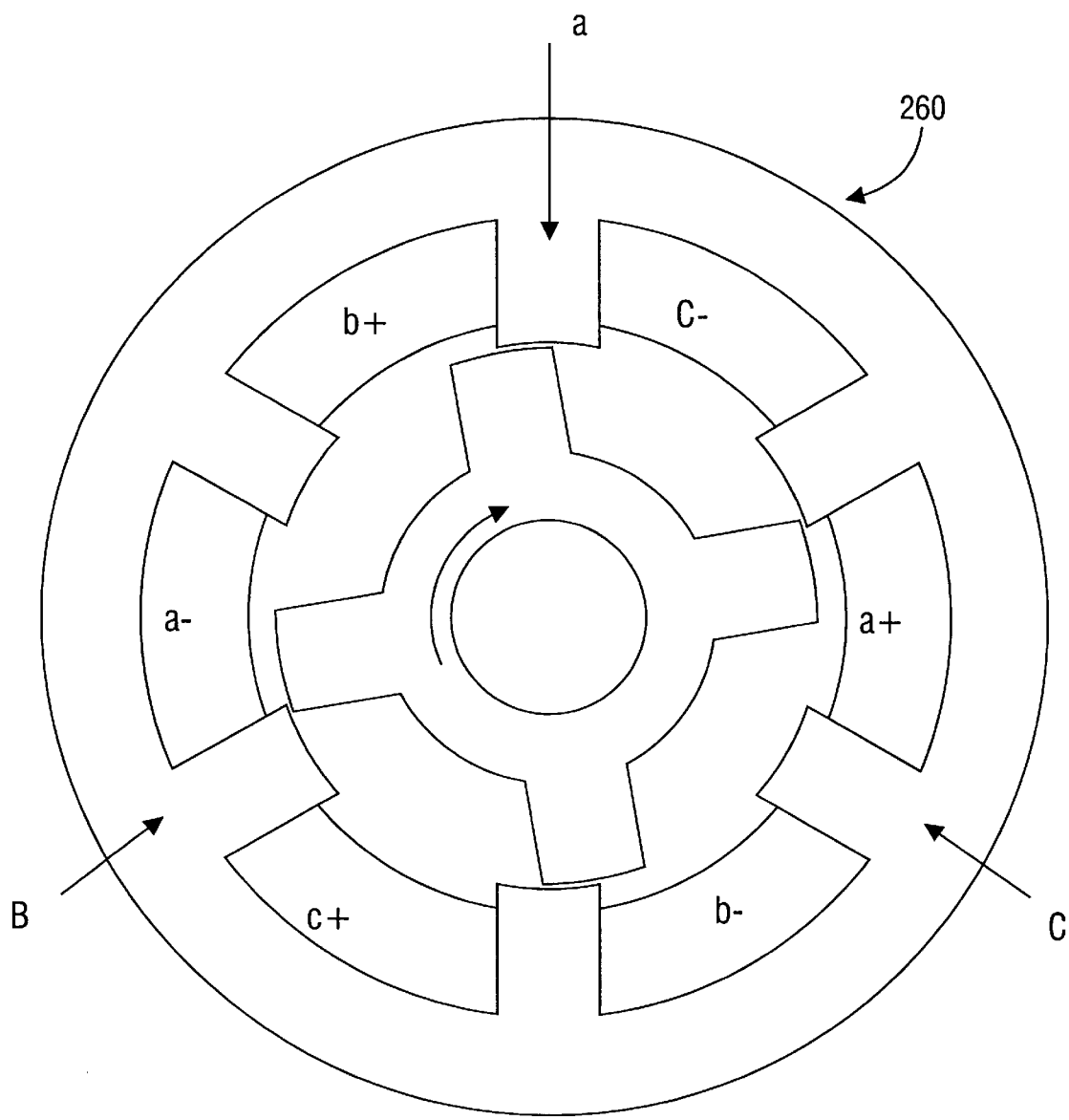
FIG. 26 illustrates an exemplary reluctance machine having a four-pole rotor, a six-pole stator and three fully-pitched phase windings.

FIG. 26 illustrates an exemplary reluctance machine 260 including a four-pole rotor and a six pole stator. Positioned within the stator are three fully-pitched phase windings a, b and c. In the exemplary embodiment of FIG. 26, the windings are positioned to produce magnetic fields having north poles corresponding to the points of the corresponding arrows when positive current is applied to the phase windings.

Figures 27A, 27B:
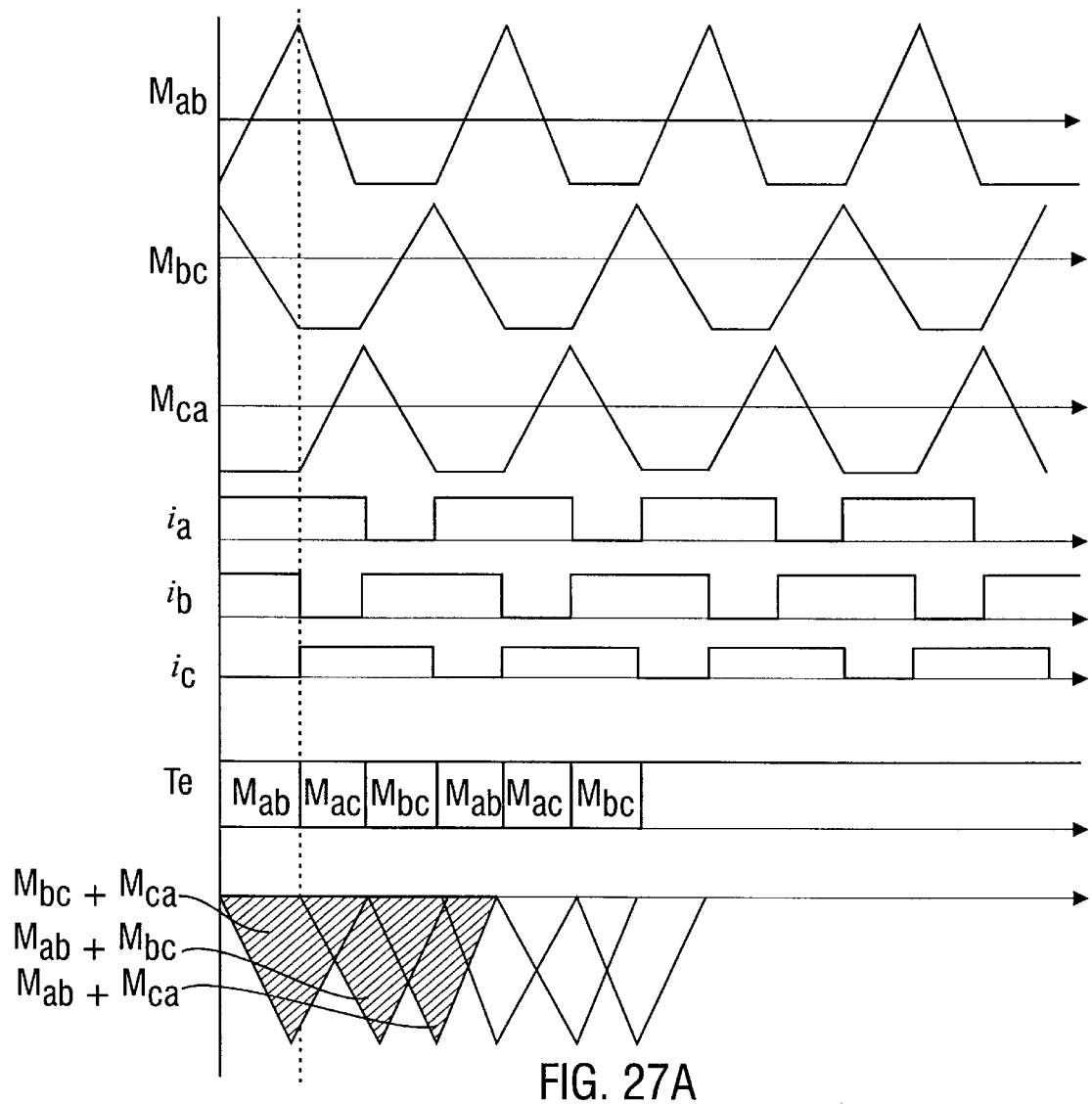
FIGS. 27A and 27B illustrate the mutual inductances between the three-phase winding of the machine of FIG. 26 as well as an appropriate sensorless energization scheme for the machine.

FIG. 27A illustrates the mutual-inductances between the three phase windings of machine 260 as well as the currents for one appropriate energization scheme. FIG. 27A also illustrates the sums of: (i) the mutual inductance during 0 to 60 degree rotor interval between the phase b and c windings and between the phase c and a windings ($M_{bc}+M_{ca}$); (ii) the mutual inductances during 30 to 60 degree rotor intervals between the phase a and b windings and between the phase b and c windings ($M_{ab}+M_{bc}$); and (iii) the mutual inductances during 60 to 120 degree rotor intervals between the phase a and b windings and between the phase a and c windings ($M_{ab}+M_{ca}$). As reflected in these figures, the sums of these mutual inductances provide three waveforms where the slope of one of the waveforms changes sign at each switching point for the energization scheme of FIG. 27A. For example, at the switching points corresponding to the 30 and 120 degree rotor positions, the $M_{bc}+M_{ca}$ waveform changes sign, for the 60 and 150 rotor positions, the $M_{ab}+M_{bc}$ waveform changes signs, and for the 0, 90 and 180 degree rotor positions, the $M_{ab}+M_{ca}$ waveform changes sign.

The $M_{bc}+M_{ca}$ and $M_{ab}+M_{bc}$ and $M_{ab}+M_{ca}$ waveforms cannot be easily detected, but can be indirectly detected by monitoring the induced voltage on the unenergized phase winding for each rotor position interval. For example, over the 0–30 degree rotor interval the phase a and b windings are energized, while the phase c winding is not energized. The total flux linkages for the phase c winding, $\psi_c$, over that interval will correspond to $\psi_c == M_{bc}I_b + M_{ca}I_a$ or, assuming that $I_a$ and $I_b$ are approximately equal in magnitude, $(M_{bc}+M_{ca})I_a$. Thus, the total flux-linkages $\psi_c$ for the phase c winding over that interval will correspond to $M_{bc}+M_{ca}$ which is the waveform of interest over that interval.

It is generally understood that the induced voltage on a phase winding corresponds to the rate of change of its flux-linkages over rotor position multiplied by the rate of change in the rotor position over time or $$V_c \propto \frac{\partial \Psi_c}{\partial \theta} \frac{\partial \theta}{\partial t}.$$

Thus, over the 0–30 degree interval the induced voltage on the phase c winding will correspond to the slope of change of the total-flux linkages of the phase c winding which in turn correspond to the slope of change of $M_{bc}+M_{ca}$. Thus, by monitoring the induce voltage on the phase c winding over the 0–30 degree interval it is possible to detect the rotor position at which the slope of the $M_{bc}+M_{ca}$ waveform changes sign. This position will correspond to the rotor position where the induced voltage on the phase c winding changes sign.

The explanation provided above for the 0–30 degree rotor position interval and the phase c winding applies equally well to the unenergized phase winding of all of the rotor position intervals illustrated in FIG. 27A. Thus, by monitoring the induced voltage in the unenergized phase winding over each rotor position interval and implementing a switching act when the monitored voltage changes sign, a sensorless switching scheme may be implemented. Circuitry similar to that illustrated in FIG. 24A may be used to implement the sensorless switching scheme of FIG. 27A.

FIG. 27B illustrates the voltage to be monitored and the switching events that should be used to implement the scheme of FIG. 27A.

Figures 28A, 28B:
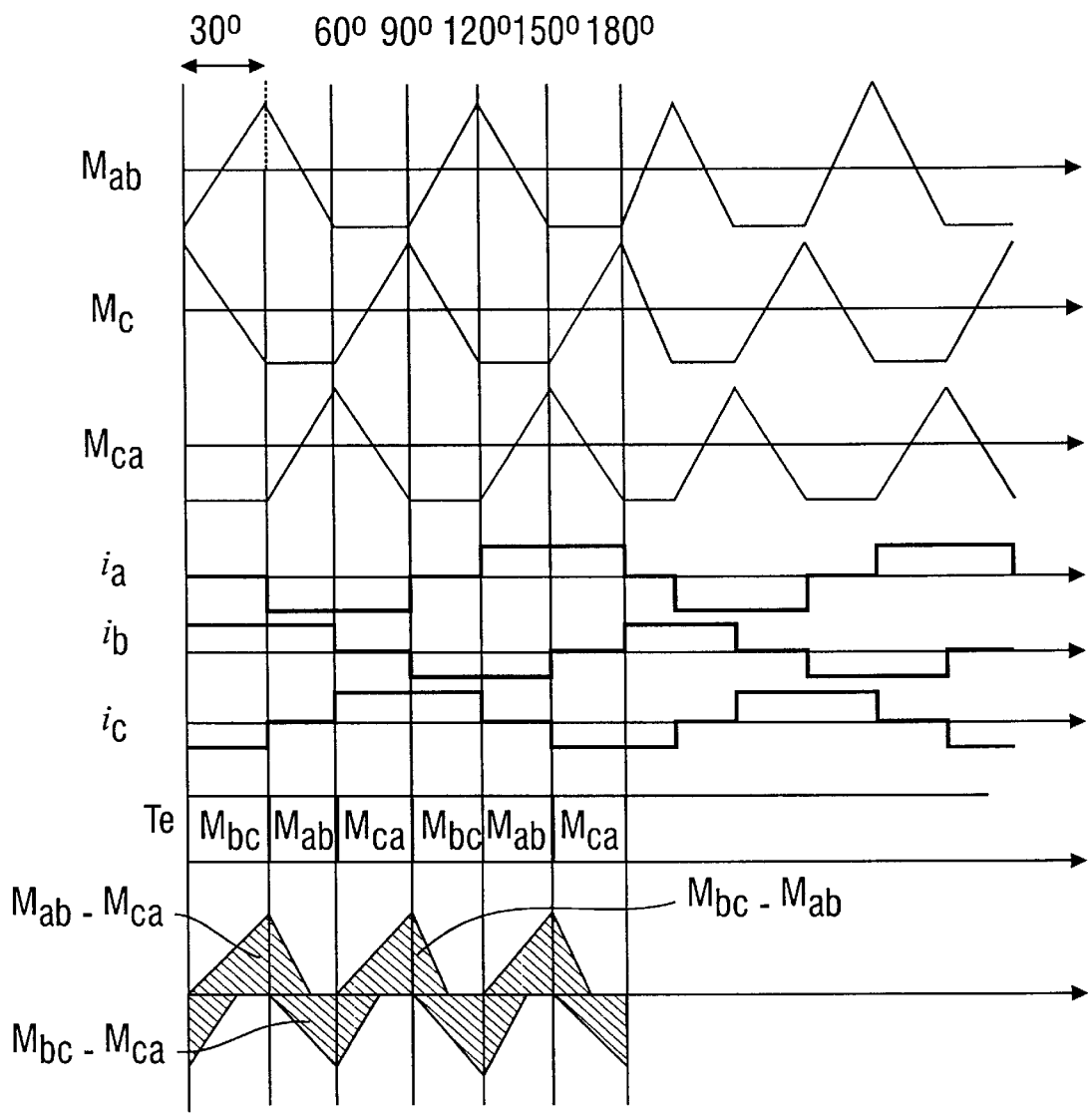
FIGS. 28A and 28B illustrate an alternate sensorless energization scheme for the machine of FIG. 26.

FIGS. 28A and 28B illustrates an alternate energization scheme for the machine of FIG. 26 that may be implemented through the use of the sensorless switching scheme of the present invention. Again, in this example, the induced voltage on the unenergized phase winding is monitored and the appropriate switching act occurs when this voltage begins to change sign. In the example of FIGS. 28A and 28B, however, the switching act occurs when the induced voltage changes signs from positive to negative while in the example of FIGS. 27A and 27B, the switching act occurs when the sign of the monitored voltage changes from negative to positive.

As before, the sensorless technique described may be used with machines lacking short-pitched windings to implement angle control switching.

The above description of several exemplary embodiments is made by way of example and not for purposes of limitation. Many variations may be made to the embodiments and methods disclosed herein without departing from the scope and spirit of the present invention. The present invention is intended to be limited only by the scope and spirit of the following claims.

I claim as my invention:

1. A method of controlling a switched reluctance machine having a plurality of phase windings, the phase windings including a plurality of short-pitched phase windings and a plurality of fully-pitched phase windings, the method comprising the steps of:
   over a given rotor interval, energizing at least one of the short-pitched phase windings and at least one of the fully-pitched phase windings;
   monitoring the voltage on an un-energized fully-pitched phase winding over the given rotor interval; and
   controlling the energization of at least one of the phase windings in response to the monitored voltage changing from a voltage level of one polarity to a voltage level of the opposite polarity.

2. The method of claim 1 wherein the step of controlling the energization of the phase winding comprises the step of energizing the previously un-energized phase winding when the monitored voltage changes from a voltage level of one polarity to a voltage level of the opposite polarity.

3. The method of claim 1 wherein the step of controlling the energization of the phase windings comprises the step of implementing at least one switching event at a predetermined period of time after the monitored voltage changes from a voltage level of one polarity to a voltage level of the opposite polarity.

4. The method of claim 3 wherein the at least one switching event includes the step of placing at least one phase winding in a freewheeling condition.

5. A method of controlling a switched reluctance machine having a stator defining a plurality of stator poles and a plurality of phase windings, the phase windings including a plurality of first phase windings each encircling a single stator pole and a plurality of second phase windings each encircling more than one stator pole, the method comprising the steps of:
   over a given rotor interval, energizing at least one of the first phase windings and at least one of the second phase windings;
   monitoring the voltage on an un-energized second phase winding over the given rotor interval; and
   implementing a switching act to energize the previously un-energized phase winding in response to the monitored voltage changing from a voltage level of one polarity to a voltage level of the opposite polarity and de-energize at least one of the previously energized phase windings.

6. The method of claim 5 wherein the switching act comprises the steps of:
   (i) energizing the previously un-energized phase winding;
   (ii) de-energizing one of the previously energized phase windings; and (iii) changing the polarity of the current applied to another of the previously energized phase windings.

7. The method of claim 5 wherein the switching act is implemented in response to the monitored voltage changing from a negative voltage level to a positive voltage level.

8. The method of claim 5 wherein the second phase windings comprise fully-pitched phase windings, and wherein the step of monitoring the voltage on an un-energized second phase winding includes the step of monitoring the voltage on an un-energized fully-pitched winding.

9. A method of controlling a switched reluctance machine having a plurality of phase windings, the phase windings including a plurality of short-pitched phase windings and a plurality of fully-pitched phase windings, the method comprising the steps of:
   over a given rotor interval, energizing at least one of the short-pitched phase windings and at least one of the fully-pitched phase windings;
   monitoring the voltage on an un-energized fully-pitched phase winding over the given rotor interval;
   generating a control signal in response to the monitored voltage changing from a voltage level of one polarity to a voltage level of the opposite polarity; and
   controlling the energization of the at least one of the phase windings in response to the control signal.

10. The method of claim 9 wherein the step of controlling the energization of the phase windings comprises the step of using the control signal to start a timer.

11. The method of claim 10 further comprising the step of using the output of the timer as an indication of the angular position of the rotor relative to the stator.

12. A method of controlling a switched reluctance machine having a plurality of phase windings, the phase windings including a plurality of short-pitched phase windings and a plurality of fully-pitched phase windings, wherein at least two phase windings are mutually coupled to each other, the method comprising the steps of:
   over a given rotor interval, energizing at least one of the short-pitched phase windings and at least one of the fully-pitched phase windings;
   monitoring a voltage on an un-energized fully-pitched phase winding that is mutually coupled to at least one of the energized phase windings, the voltage resulting from the mutual coupling between the at least one energized phase winding and the un-energized phase winding;
   generating a control signal in response to the monitored voltage changing from a voltage level of one polarity to a voltage level of the opposite polarity; and controlling the energization of the phase windings in response to the control signal.

13. A switched reluctance machine system comprising:
a switched reluctance machine including a stator defining a plurality of stator poles, a plurality of phase windings positioned within the stator, and a rotor positioned to rotate relative to the stator, the phase windings including a plurality of first phase windings each encircling a single stator pole and a plurality of second phase windings each encircling more than one stator pole;
a voltage detection circuit coupled to the phase windings for detecting the voltage on a given one of the second phase windings and for generating a control signal in response to the detected voltage changing from a voltage of one polarity to a voltage of opposite polarity and utilizing the control signal to generate at least one switching signal; and
a power inverter responsive to the at least one switching signal for controlling the application of electric power to at least one of the phase windings other than the given one of the second phase windings.

14. The machine system of claim 13 wherein the second phase windings in the switched reluctance machine comprise fully-pitched windings.

15. The machine system of claim 13 wherein the second phase windings in the switched reluctance machine comprise fractional-pitched windings.

16. The machine system of claim 13 wherein the power inverter includes a full H-bridge switching arrangement for at least some of the phase windings.

17. The machine system of claim 13 wherein the voltage detection circuit includes a differential amplifier having first and second inputs that receives at the first input a voltage signal corresponding to the voltage on the given phase winding and that receives at the second input a voltage signal corresponding to a predetermined voltage, the differential amplifier producing a signal at a given logic level when the voltage signal at the first input is greater than the voltage signal at the second input.

18. The machine system of claim 17 wherein the predetermined voltage is reference ground.

19. A switched reluctance machine system comprising:
a switched reluctance machine including a stator, a plurality of phase windings positioned within the stator, wherein the phase windings include fully-pitched windings and short-pitched phase windings, and a rotor positioned to rotate relative to the stator;
a voltage detection circuit coupled to the phase windings for detecting the voltage on a given phase winding and for generating a control signal in response to the voltage on the given phase winding changing from a voltage of one polarity to a voltage of opposite polarity and utilizing the control signal to generate at least one switching signal; and
a power inverter responsive to the at least one switching signal for controlling the application of electric power to at least some of the phase windings.

20. The machine system of claim 19 wherein the given phase winding is a fully-pitched phase winding.

21. A switched reluctance machine system comprising:
a switched reluctance machine including a stator, a plurality of phase windings positioned within the stator, and a rotor positioned to rotate relative to the stator;
a voltage detection circuit coupled to the phase windings for detecting the voltage on a given phase winding and for generating a control signal in response to the voltage on the given phase winding changing from a voltage of one polarity to a voltage of opposite polarity and utilizing the control signal to generate at least one switching signal; and
a power inverter responsive to the at least one switching signal for controlling the application of electric power to at least some of the phase windings wherein the power inverter includes:
a DC bus having a positive rail and a negative rail;
a first capacitor having first and second terminals, the first terminal of the first capacitor being coupled to the positive rail of the DC bus;
a second capacitor having first and second terminals, the first terminal of the second capacitor being coupled to the negative rail of the DC bus, the second terminals of the first and second capacitors being coupled together to form a common point;
a first set of power switching devices, each coupling one of the phase windings to the positive rail of the DC bus; and
a second set of power switching devices, each coupling one of the phase windings to the negative rail of the DC bus;
wherein the ends of the phase windings not coupled to power switching devices are coupled to the common point.

22. A switched reluctance machine system comprising:
a switched reluctance machine including a stator, a plurality of phase windings positioned within the stator, and a rotor positioned to rotate relative to the stator;
a voltage detection circuit coupled to the phase windings for detecting the voltage on a given phase winding and for generating a control signal in response to the voltage on the given phase winding changing from a voltage of one polarity to a voltage of opposite polarity and utilizing the control signal to generate at least one switching signal, wherein the voltage detection circuit includes:
a differential amplifier having first and second inputs that receives at the first input a voltage signal corresponding to the voltage on the given phase winding and that receives at the second input a voltage signal corresponding to reference ground, the differential amplifier producing a signal at a given logic level when the voltage signal at the first input is greater than the voltage signal at the second input; a zero current detector coupled to the given phase winding that produces an output of a given logic level when the current detector, the AND gate producing a signal having a given logic level when the outputs of the differential amplifier and the zero current detector are both at a given logic level; and
a power inverter responsive to the at least one switching signal for controlling the application of electric power to at least some of the phase windings.

23. The machine system of claim 22 wherein the output of the AND gate is coupled to logic circuitry for generating the at least one switching signal.

24. The machine system of claim 23 where in the logic circuitry includes circuitry for modulating the at least one switching signal to control the current in the given phase winding.

25. The machine system of claim 23 wherein the logic circuitry generates a switching signal to apply electric power to the given phase winding when the output of the AND gate is at a given logic level.

26. The machine system of claim 25 further including circuitry for detecting the voltage in a phase winding other than the given phase winding and generating control signal for the other phase winding when the voltage on the other phase winding transitions from a voltage of one polarity to a voltage of the opposite polarity.

27. The machine system of claim 26 wherein the logic circuitry terminates the application of electric power to the given phase winding as a result of the control for the other phase winding reaching a particular logic level such that the energization of the given phase winding and the other phase winding are interlocked.

* * * * *